US012694177B2

(12) United States Patent
    Takenaka

(10) Patent No.: US 12,694,177 B2
(45) Date of Patent: Jul. 28, 2026

(54) INFORMATION PROCESSING CIRCUIT AND METHOD FOR DESIGNING INFORMATION PROCESSING CIRCUIT

(71) Applicant: NEC Corporation, Tokyo (JP)

(72) Inventor: Takashi Takenaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 818 days.

(21) Appl. No.: 17/926,728

(22) PCT Filed: May 26, 2020

(86) PCT No.: PCT/JP2020/020701
    § 371 (c)(1),
    (2) Date: Nov. 21, 2022

(87) PCT Pub. No.: WO2021/240633
    PCT Pub. Date: Dec. 2, 2021

(65) Prior Publication Data
    US 2023/0205957 A1     Jun. 29, 2023

(51) Int. Cl.
    *G06F 30/32*         (2020.01)
    *G06F 119/02*        (2020.01)
(52) U.S. Cl.
    CPC .......... *G06F 30/32* (2020.01); *G06F 2119/02* (2020.01)
(58) Field of Classification Search
    CPC ............................ G06F 30/32; G06F 2119/02
    USPC ....................................................... 716/100
    See application file for complete search history.

(56) References Cited

U.S. PATENT DOCUMENTS

| | | | | |
|---|---|---|---|---|
| 11,586,907 | B2 * | 2/2023 | Singh .................... | G06F 9/3001 |
| 2019/0212982 | A1 | 7/2019 | Yoda et al. | |
| 2019/0266485 | A1 * | 8/2019 | Singh .................... | G06N 3/063 |
| 2019/0318232 | A1 | 10/2019 | Cruz-Albrecht et al. | |
| 2020/0073912 | A1 | 3/2020 | Hiroi et al. | |
| 2021/0056397 | A1 * | 2/2021 | Dally .................... | G06F 7/4833 |
| 2022/0413806 | A1 * | 12/2022 | Takenaka ................ | G06F 17/16 |
| 2023/0075457 | A1 * | 3/2023 | Takahashi ............ | G06N 3/0464 |
| 2023/0376769 | A1 * | 11/2023 | Ghaffari ................. | G06F 7/483 |

FOREIGN PATENT DOCUMENTS

| | | |
|---|---|---|
| CN | 110036384 A | 7/2019 |
| JP | 2002-117389 A | 4/2002 |
| JP | 2018-133016 A | 8/2018 |

(Continued)

OTHER PUBLICATIONS

TW Office Action for Taiwanese Patent Application No. 110114833, mailed on Nov. 30, 2023 with English Translation.

(Continued)

*Primary Examiner* — Suchin Parihar
(74) *Attorney, Agent, or Firm* — Sughrue Mion, PLLC

(57) ABSTRACT

The information processing circuit 10 performs operations on layers in deep learning, and includes a product sum circuit 11 which performs a product-sum operation using input data and parameter values, and a parameter value output circuit 12 which outputs the parameter values, wherein the parameter value output circuit 12 is composed of a combinational circuit, and includes a first parameter value output circuit 13 manufactured in a way that a circuit configuration cannot be changed and a second parameter value output circuit 14 manufactured in a way that allows a circuit configuration to be changed.

10 Claims, 17 Drawing Sheets

(56)         References Cited

FOREIGN PATENT DOCUMENTS

| | | | |
|---|---|---|---|
| JP | 2019-139742 | A | 8/2019 |
| TW | 201935286 | A | 9/2019 |

OTHER PUBLICATIONS

International Search Report for PCT Application No. PCT/JP2020/
020701, mailed on Aug. 11, 2020.
P. N. Whatmough et al., "FixyNN: Efficient Hardware for Mobile
Computer Vision via Transfer Learning", Feb. 27, 2019.

* cited by examiner

FIG. 5

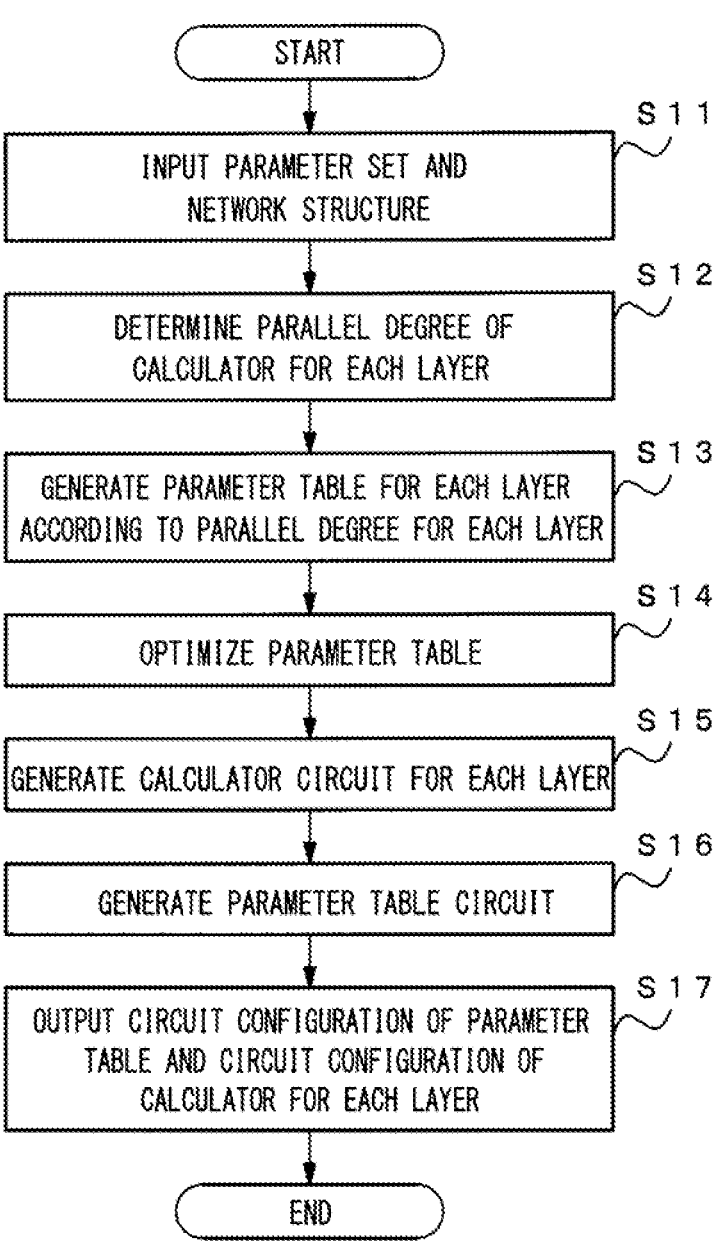

START

INPUT PARAMETER SET AND
NETWORK STRUCTURE                          S11

DETERMINE PARALLEL DEGREE OF
CALCULATOR FOR EACH LAYER                  S12

GENERATE PARAMETER TABLE FOR EACH LAYER
ACCORDING TO PARALLEL DEGREE FOR EACH LAYER   S13

OPTIMIZE PARAMETER TABLE                    S14

GENERATE CALCULATOR CIRCUIT FOR EACH LAYER  S15

GENERATE PARAMETER TABLE CIRCUIT            S16

OUTPUT CIRCUIT CONFIGURATION OF PARAMETER
TABLE AND CIRCUIT CONFIGURATION OF
CALCULATOR FOR EACH LAYER                   S17

END

START

S141
MEASURE RECOGNITION ACCURACY
OF CNN

S142
RECOGNITION ACCURACY IS
MORE THAN OR EQUAL TO
FIRST REFERENCE VALUE ?

Yes

No

S144
CIRCUIT AREA OF
PARAMETER TABLE IS LESS THAN OR EQUAL
TO SECOND REFERENCE VALUE ?

Yes

No

S143
CHANGE PARAMETER VALUES
IN PARAMETER TABLE

END

302a

| 5 | 3 | 2 |
| 5 | 2 | 3 |
| 1 | 1 | 4 |

302b

| 5 | 3 | 0 |
| 5 | 0 | 3 |
| 0 | 0 | 4 |

FIG. 12

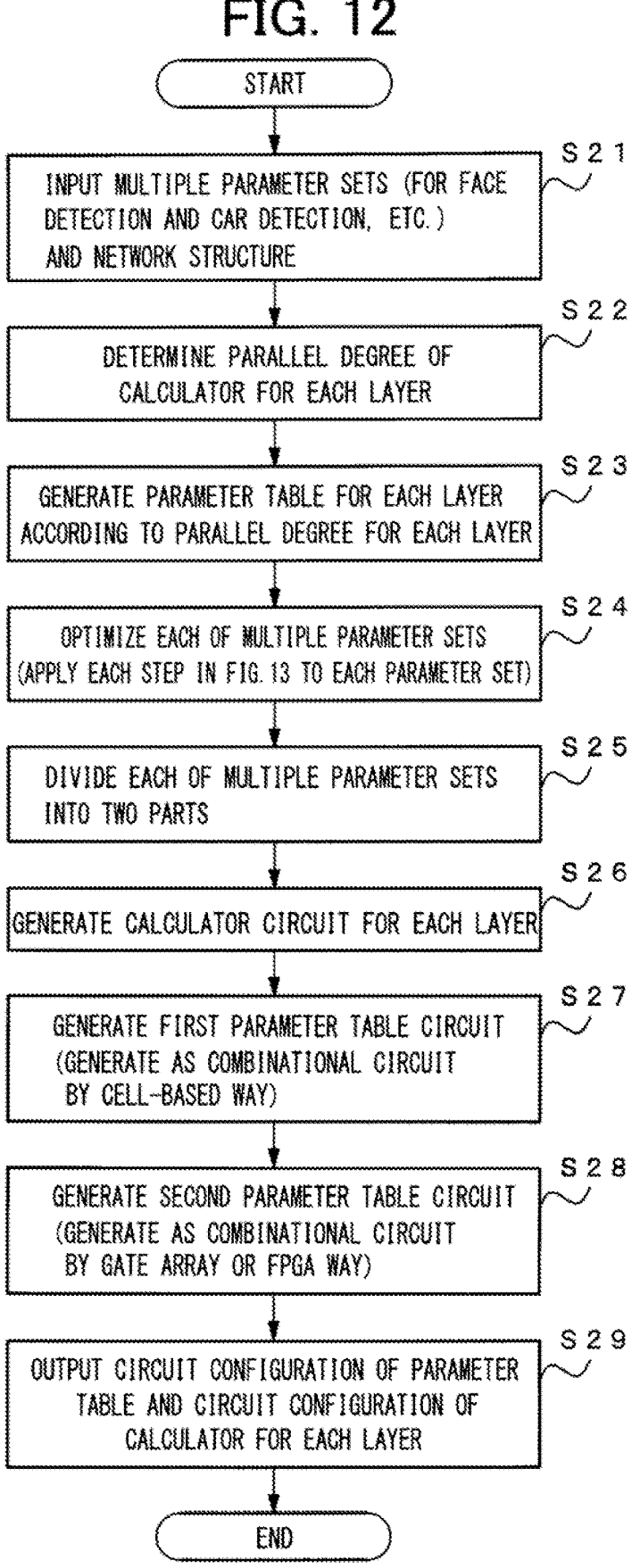

START

INPUT MULTIPLE PARAMETER SETS (FOR FACE DETECTION AND CAR DETECTION, ETC.) AND NETWORK STRUCTURE — S21

DETERMINE PARALLEL DEGREE OF CALCULATOR FOR EACH LAYER — S22

GENERATE PARAMETER TABLE FOR EACH LAYER ACCORDING TO PARALLEL DEGREE FOR EACH LAYER — S23

OPTIMIZE EACH OF MULTIPLE PARAMETER SETS (APPLY EACH STEP IN FIG.13 TO EACH PARAMETER SET) — S24

DIVIDE EACH OF MULTIPLE PARAMETER SETS INTO TWO PARTS — S25

GENERATE CALCULATOR CIRCUIT FOR EACH LAYER — S26

GENERATE FIRST PARAMETER TABLE CIRCUIT (GENERATE AS COMBINATIONAL CIRCUIT BY CELL-BASED WAY) — S27

GENERATE SECOND PARAMETER TABLE CIRCUIT (GENERATE AS COMBINATIONAL CIRCUIT BY GATE ARRAY OR FPGA WAY) — S28

OUTPUT CIRCUIT CONFIGURATION OF PARAMETER TABLE AND CIRCUIT CONFIGURATION OF CALCULATOR FOR EACH LAYER — S29

END

FIG. 14
TRUTH TABLE FOR CIRCUIT A
| A | B | C | Z1 | 401 |
|---|---|---|----|-----|
| 0 | 0 | 0 | 0 | |
| 0 | 0 | 1 | 0 | |
| 0 | 1 | 0 | 0 | |
| 0 | 1 | 1 | 0 | |
| 1 | 0 | 0 | 0 | |
| 1 | 0 | 1 | 1 | |
| 1 | 1 | 0 | 0 | |
| 1 | 1 | 1 | 1 | |
TRUTH TABLE FOR CIRCUIT B
| A | B | C | Z2 | 402 |
|---|---|---|----|-----|
| 0 | 0 | 0 | 0 | |
| 0 | 0 | 1 | 0 | |
| 0 | 1 | 0 | 1 | |
| 0 | 1 | 1 | 0 | |
| 1 | 0 | 0 | 0 | |
| 1 | 0 | 1 | 1 | |
| 1 | 1 | 0 | 0 | |
| 1 | 1 | 1 | 0 | |
$$Z1 = A \; \& \; (NOT \; B) \; \& \; C$$
$$| \; A \; \& \; B \; \& \; C$$
$$Z2 = A \; \& \; (NOT \; B) \; \& \; C$$
$$| \; (NOT \; A) \; \& \; B \; \& \; (NOT \; C)$$
$$D = A \; \& \; (NOT \; B) \; \& \; C$$
$$Z1 = D \; | \; A \; \& \; B \; \& \; C$$
$$D = A \; \& \; (NOT \; B) \; \& \; C$$
$$Z2 = D \; | \; (NOT \; A) \; \& \; B \; \& \; (NOT \; C)$$
$$D = A \; \& \; (NOT \; B) \; \& \; C$$
$$Z1 = D \; | \; A \; \& \; B \; \& \; C$$
$$Z2 = D \; | \; (NOT \; A) \; \& \; B \; \& \; (NOT \; C)$$

FIG. 15
TRUTH TABLE FOR CIRCUIT A
| A | B | C | Z1 |
|---|---|---|----|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 1 |
| 1 | 1 | 0 | 0 |
| 1 | 1 | 1 | 1 |
411
TRUTH TABLE FOR CIRCUIT B
| A | B | C | Z2 |
|---|---|---|----|
| 0 | 0 | 0 | 0 |
| 0 | 0 | 1 | 0 |
| 0 | 1 | 0 | 1 |
| 0 | 1 | 1 | 0 |
| 1 | 0 | 0 | 0 |
| 1 | 0 | 1 | 1 |
| 1 | 1 | 0 | 0 |
| 1 | 1 | 1 | 1 |
412
Z1 = A & (NOT B) & C
| A & B & C
Z2 = A & (NOT B) & C
| (NOT A) & B & (NOT C)
| A & B & C
D = A & (NOT B) & C
| A & B & C
Z1 = D
D = A & (NOT B) & C
| A & B & C
Z2 = D | (NOT A) & B & (NOT C)
D = A & (NOT B) & C
| A & B & C
Z1 = D
Z2 = D | (NOT A) & B & (NOT C)
→ RATIO OF COMMON AREA IS LARGER THAN BEFORE CHANGING
→ CIRCUIT AREA OF INDIVIDUAL PART IS SMALL

FIG. 16
|  | CHAGE | CIRCUIT AREA |
|---|---|---|
| CELL-BASE | IMPROPER | SMALL |
| GATE ARRAY | POSSIBLE WITH SOME LIMITATIONS | MEDIUM |
| FPGA | POSSIBLE | LARGE |
FIG. 17
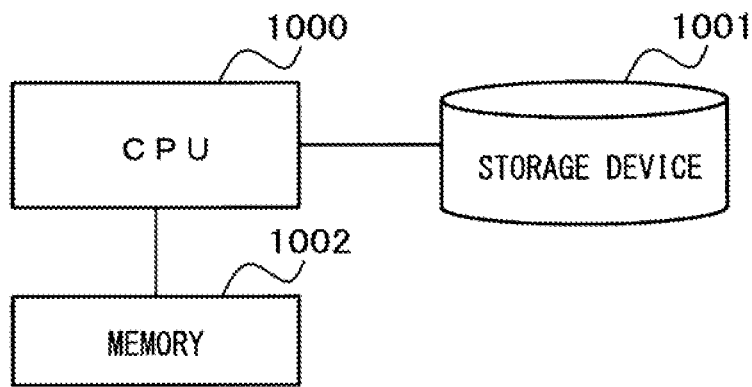
FIG. 18
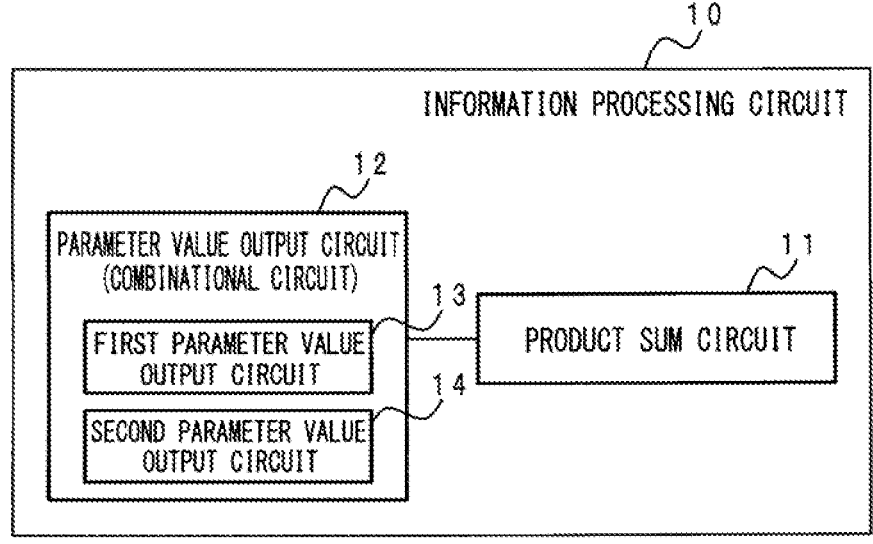

Figure 20:
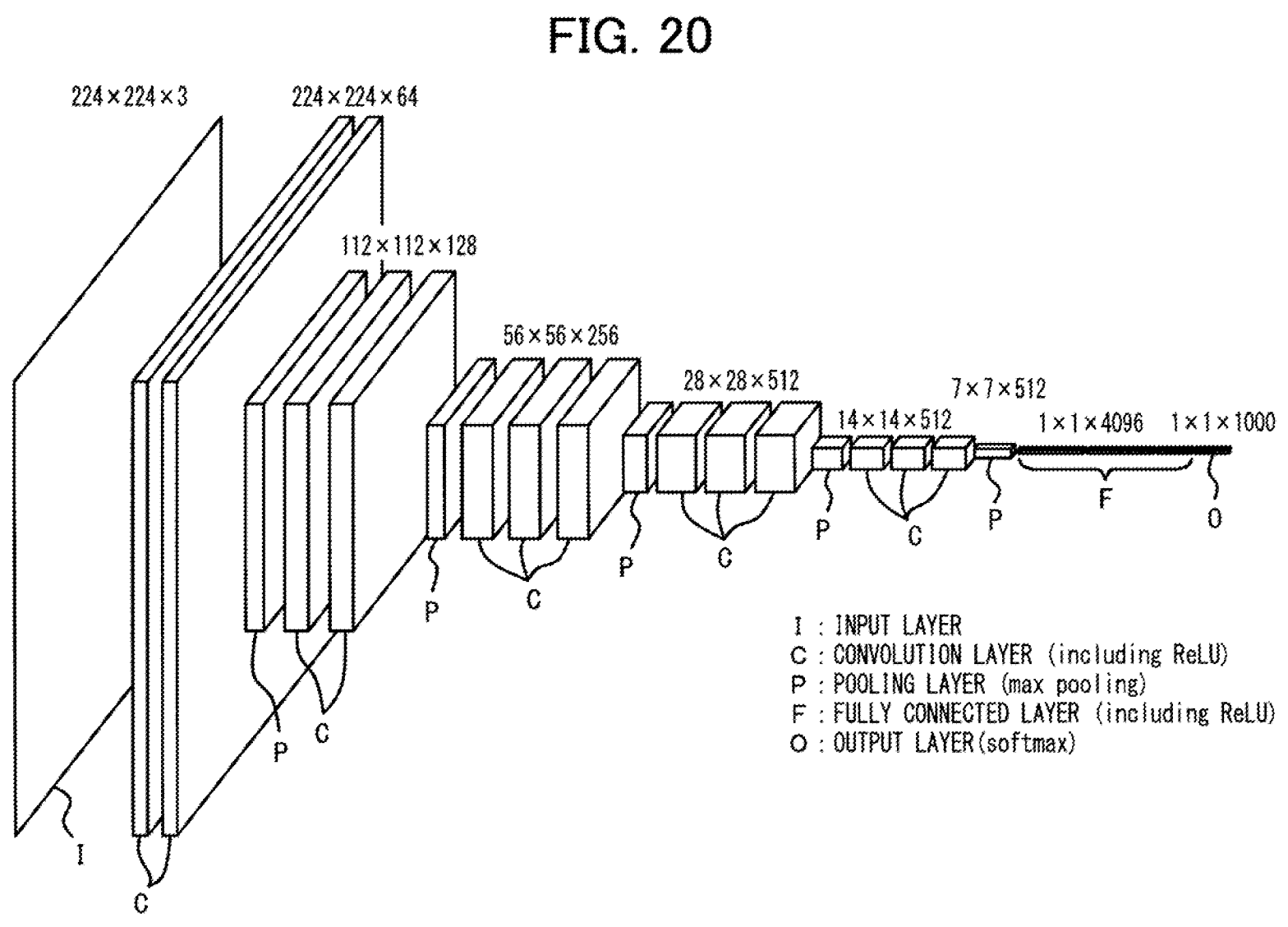

I : INPUT LAYER
C : CONVOLUTION LAYER (including ReLU)
P : POOLING LAYER (max pooling)
F : FULLY CONNECTED LAYER (including ReLU)
O : OUTPUT LAYER (softmax)

INFORMATION PROCESSING CIRCUIT AND METHOD FOR DESIGNING INFORMATION PROCESSING CIRCUIT

This application is a National Stage Entry of PCT/JP2020/020701 filed on May 26, 2020, the contents of all of which are incorporated herein by reference, in their entirety.

TECHNICAL FIELD

This invention relates to an information processing circuit that performs the inference phase of deep learning, and a method for designing such an information processing circuit.

BACKGROUND ART

Deep learning is an algorithm using a multilayer neural network (hereinafter, referred to as a network). Deep learning involves a training phase in which each network (layer) is optimized to generate a model (learned model), and an inference phase in which an inference is made based on the learned model. The model may also be referred to as an inference model. Hereinafter, the model is sometimes referred to as an inference unit (a reasoner).

In the training phase and the inference phase, calculation is executed for adjusting weights as parameters or using input data and weights as operands, and their calculation amounts are large. As a result, the processing time of each phase becomes long.

In order to accelerate deep learning, an inference unit realized by a GPU (Graphics Processing Units) is often used rather than an inference unit realized by a CPU (Central Processing Unit). In addition, accelerators dedicated to deep learning have been put to practical use.

FIG. 20 is an explanatory diagram showing a structure of VGG (Visual Geometry Group)-16 that is an example of a convolutional neural network (CNN). VGG-16 includes 13 convolution layers and 3 fully connected layers. Features extracted in the convolution layer or in the convolution and pooling layers are classified in the fully connected layer.

In FIG. 20, "I" indicates an input layer. "C" indicates a convolution layer. In FIG. 20, the convolution layer is 3×3 convolution layer. Thus, for example, the first convolution operation shown in FIG. 20 includes a product-sum operation of 3 (vertical size)×3 (horizontal size)×3 (input channels)×64 (output channels) per a pixel. For example, the convolution layer of the fifth block in FIG. 20 includes a product-sum operation of 3 (vertical size)×3 (horizontal size)×3 (output channel)×512 (input channels)×512 (output channels) per pixel. "P" indicates a pooling layer. In the CNN shown in FIG. 20, the pooling layer is the Max Pooling layer. "F" indicates a fully connected layer. "O" indicates an output layer. In the output layer, a softmax function is used. The convolutional and fully connected layers include ReLU (Rectified Linear Unit). The multiplication formula attached to each layer represents the vertical size×horizontal size×the number of channels of data corresponding to a single input image. The volume of the rectangle representing a layer corresponds to the amount of activation in the layer.

CITATION LIST

Patent Literature

PTL 1: Japanese Patent Application Laid-Open No. 2019-139742

Non-Patent Literature

NPL 1: P. N. Whatmough et al., "FixyNN: Efficient Hardware for Mobile Computer Vision via Transfer Learning", Feb. 27, 2019

SUMMARY OF INVENTION

Technical Problem

There are two main ways to realize an inference unit by an accelerator.

Taking a circuit processing CNN as an example, in the first method, a circuit processing CNN is configured to execute operations of the multiple layers that make up the circuit processing CNN by a common calculator (refer to paragraph 0033, etc. of PTL 1, for example).

FIG. 21 an explanatory diagram showing a schematic calculator of a circuit processing CNN configured to execute calculation of multiple layers by a common calculator. The part that executes the calculation in the inference unit comprises a calculator 700 and a memory (for example, DRAM (Dynamic Random Access Memory)) 900. The calculator 700 shown in FIG. 21 forms a number of adders and a number of multipliers. In FIG. 21, "+" indicates an adder. "*" indicates a multiplier. Although three adders and six multipliers are shown in FIG. 21, the number of adders and multipliers that can execute calculation of all layers in a circuit processing CNN is formed.

When calculation is to be performed on each layer of the inference unit, the calculator 700 reads parameters for one layer in which the operation is to be performed from DRAM 900. Then, the calculator 700 executes a product-sum operation for the layer, using the parameters as coefficients.

In the second method, a circuit processing CNN is configured to execute an operation of each layer of CNN by a corresponding calculator to each layer (refer to NPL 1, for example). NPL 1 describes that a CNN is divided into two stages, and calculators corresponding to each of layers in the first stage are provided.

FIG. 22 is an explanatory diagram showing a schematic CNN with calculators corresponding to each of layers. FIG. 22 illustrates six layers 801, 802, 803, 804, 805, and 806. The calculator (circuit) 701, 702, 703, 704, 705, and 706 corresponding to each of layers 801, 802, 803, 804, 805, and 806 are provided.

Since the calculators 701 to 706 execute calculation corresponding to each of layers 801 to 806, the circuit configuration of each of the calculators 701 to 706 is fixed if parameters are fixed. Non-patent document 1 describes that the parameters are fixed values.

In the first method described above, since DRAM 900 is provided, if the parameters of CNN are changed, its functions are performed without changing the circuit configuration of the calculators 701 to 706. However, the data transfer rate of the DRAM 900 is slow compared to the calculation speed of the calculator 700. In other words, the memory bandwidth of DRAM 900 is narrow. Therefore, the data transfer between the calculator 700 and the memory becomes a bottleneck. As a result, the calculation speed of the circuit processing CNN is limited.

In the second method described above, since calculators 701-706 are provided for each of the layers, the whole circuit scale of the circuit processing CNN becomes larger.

In the method described in NPL 1, by fixing parameters and a network configuration, the circuit scale of the adders and multipliers of the circuit processing CNN is reduced. However, since the method described in NPL 1 is configured to allow fully-parallel processing at each layer, the circuit scale increases by such a circuit configuration. In addition, since the circuit is configured so that the calculation corresponding to each of input channels and output channels is executed in parallel for each layer, the circuit scale becomes larger by such a circuit configuration. Further, since the circuit is configured to allow completely parallel processing for each layer, it is preferable that the processing times for input data corresponding to a single image are the same for each layer.

In a CNN, the later the layer (closer to the output layer), in general, the smaller the vertical or horizontal size of the input data corresponding to a single image may be. For example, the pooling layer reduces the vertical and horizontal sizes of the input data corresponding to a single image. In the case that each layer processes the data corresponding to a single input image in the same amount of time, the calculation amount in the later layer will be smaller, unless the number of channels in the later layer is extremely large. In other words, the later layer, the smaller the circuit scale for executing calculation in the layer may be. However, in the method described in NPL 1, since the calculator 700 is configured to be able to perform operations of all input and output channels in parallel, the input data corresponding to a single image is processed quickly for a layer of smaller vertical and horizontal sizes of the input data, and there is a waiting period until input data corresponding to the next image is supplied. In other words, the utilization of the 700 calculator is lower.

The configuration of the circuit processing CNN described in NPL 1 is a CNN is divided into two stages, and calculators corresponding to each of layers are provided in the first stage. In the latter stage, parameters are transferred to DRAM and a programmable accelerator is used as a calculator. In other words, the circuit processing CNN is configured to be able to respond to changes in parameters and a network configuration to a certain extent. NPL 1 does not describe that parameters and network configuration are fixed in the circuit processing CNN as a whole i.e., in the inference unit as a whole.

When parameters and network configuration are fixed as a whole, it is difficult to change the network structure and weights (parameters) for deep learning once the circuit has been manufactured. For example, a circuit manufactured as a face recognition chip can only be used for face recognition. In other words, a circuit with fixed parameters and network structure is difficult to adapt to other types of CNNs.

It is an purpose of the present invention to provide an information processing circuit that is free from memory bandwidth limitation and improves utilization of a calculator in each layer in the inference unit when the inference unit is realized in hardware, and a method for designing an information processing circuit.

Solution to Problem

The information processing circuit according to the present invention is an information processing circuit, that performs operations on layers in deep learning, and includes a product sum circuit which performs a product-sum operation using input data and parameter values, and a parameter value output circuit which outputs the parameter values, wherein the parameter value output circuit is composed of a combinational circuit, and includes a first parameter value output circuit manufactured in a way that a circuit configuration cannot be changed and a second parameter value output circuit manufactured in a way that allows a circuit configuration to be changed.

The method of designing an information processing circuit according to the present invention is a design method for generating the information processing circuit performing operations on layers in deep learning, and includes inputting data for identifying multiple types of parameter sets including multiple learned parameter values and a network structure, generating a product sum circuit which performs a product-sum operation using input data and the parameter values, and specializing in a layer in the network structure, and generating, as a combinational circuit that outputs the parameter values in the multiple types of parameter sets, a first parameter value output circuit realized in a way that a circuit configuration cannot be changed and a second parameter value output circuit realized in a way that allows a circuit configuration to be changed.

The program of designing an information processing circuit according to the present invention is a program for generating the information processing circuit performing operations on layers in deep learning, and causes a processor to execute a process of inputting data for identifying multiple types of parameter sets including multiple learned parameter values and a network structure, a process of generating a product sum circuit which performs a product-sum operation using input data and the parameter values, and specializing in a layer in the network structure, and a process of generating, as a combinational circuit that outputs the parameter values in the multiple types of parameter sets, a first parameter value output circuit realized in a way that a circuit configuration cannot be changed and a second parameter value output circuit realized in a way that allows a circuit configuration to be changed.

The information processing circuit designing device according to the present invention includes input means for inputting data for identifying multiple types of parameter sets including multiple learned parameter values and a network structure, calculator generation means for generating a product sum circuit which performs a product-sum operation using input data and the parameter values, and specializing in a layer in the network structure, and parameter value output circuit generation means for generating a combinational circuit that outputs the parameter values in the multiple types of parameter sets, wherein the parameter value output circuit generation means includes first parameter value output circuit generation means for generating a first parameter value output circuit realized in a way that a circuit configuration cannot be changed, and second parameter value output circuit generation means for generating a second parameter value output circuit realized in a way that allows a circuit configuration to be changed.

Advantageous Effects of Invention

According to the present invention, it is possible to obtain an information processing circuit that is free from memory bandwidth constraints and that improves the utilization of each layer of calculators in the inference unit.

BRIEF DESCRIPTION OF DRAWINGS

FIG. 5 It depicts a flowchart showing an operation of an information processing circuit designing device of the first example embodiment.

FIG. 12 It depicts a flowchart showing an operation of an information processing circuit designing device of the second example embodiment.

FIG. 14 It depicts an explanatory diagram showing an example of a truth table before changing the parameter values.

FIG. 15 It depicts an explanatory diagram showing an example of a truth table after changing the parameter values.

FIG. 16 It depicts an explanatory diagram showing the characteristics of a circuit manufactured by each manufacturing method.

FIG. 17 It depicts a block diagram showing an example of a computer with a CPU.

FIG. 18 It depicts a block diagram showing the main part of the information processing circuit.

FIG. 20 It depicts an explanatory diagram showing a structure of VGG-16.

DESCRIPTION OF EMBODIMENTS

Hereinafter, an example embodiment of the present invention will be described with reference to the drawings. In the following explanation, a CNN inference unit will be used as an example of an information processing circuit. In addition, an image (image data) will be used as an example of data input to the CNN.

Figures 21, 22:
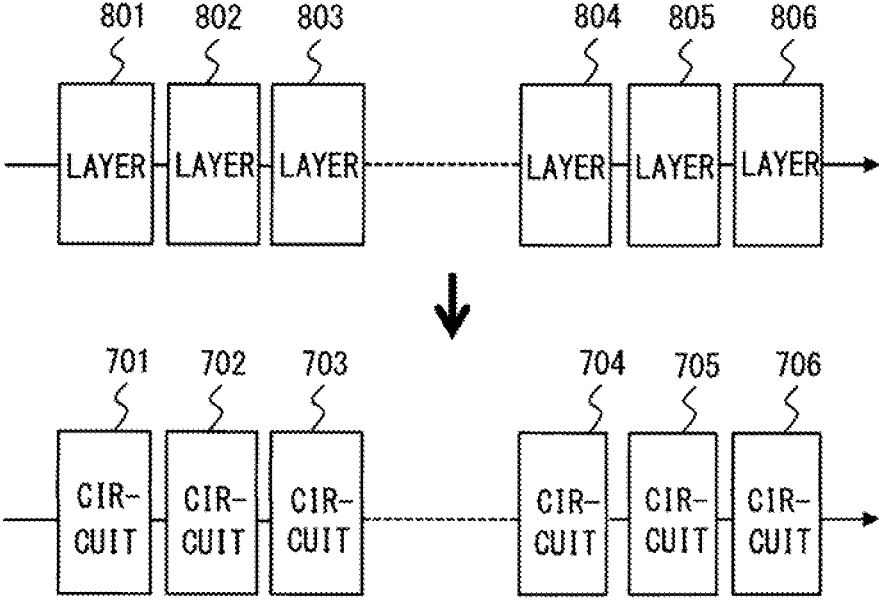
FIG. 21 It depicts an explanatory diagram showing a schematic calculator of a CNN configured to execute operations of multiple layers using a common calculator.
FIG. 22 It depicts an explanatory diagram showing a schematic CNN with calculators corresponding to each of layers.

Similar to the configuration illustrated in FIG. 22, the information processing circuit is a CNN inference unit in which calculators corresponding to each layer of the CNN are installed. The information processing circuit realizes a CNN inference unit with fixed parameters and a fixed network configuration (type of deep learning algorithm, how many layers of what type and in what order, size of input data and output data for each layer, etc.). In other words, the information processing circuit is a circuit with a circuit configuration specialized for each layer of the CNN (for example, each of the convolutional and fully connected layers). Specialization means that it is a dedicated circuit that exclusively executes calculation of the layer.

The fact that the parameters are fixed means that the training phase process is completed, the appropriate parameters are determined, and the determined parameters are used. However, in this example embodiment, the parameters determined in the training phase may be changed. Hereinafter, changing the parameters is sometimes expressed as a parameter being optimized.

In the inference unit using the information processing circuit according to the present invention, the parallel degree is determined by taking into account the data input speed and processing speed. The multiplier multiplying parameters (weights) by input data in the inference unit comprises a combinational logic circuit (combinational circuit). Alternatively, the multiplier may be composed of a pipelined calculator or an ordinal circuit.

Example Embodiment 1

Figure 1:
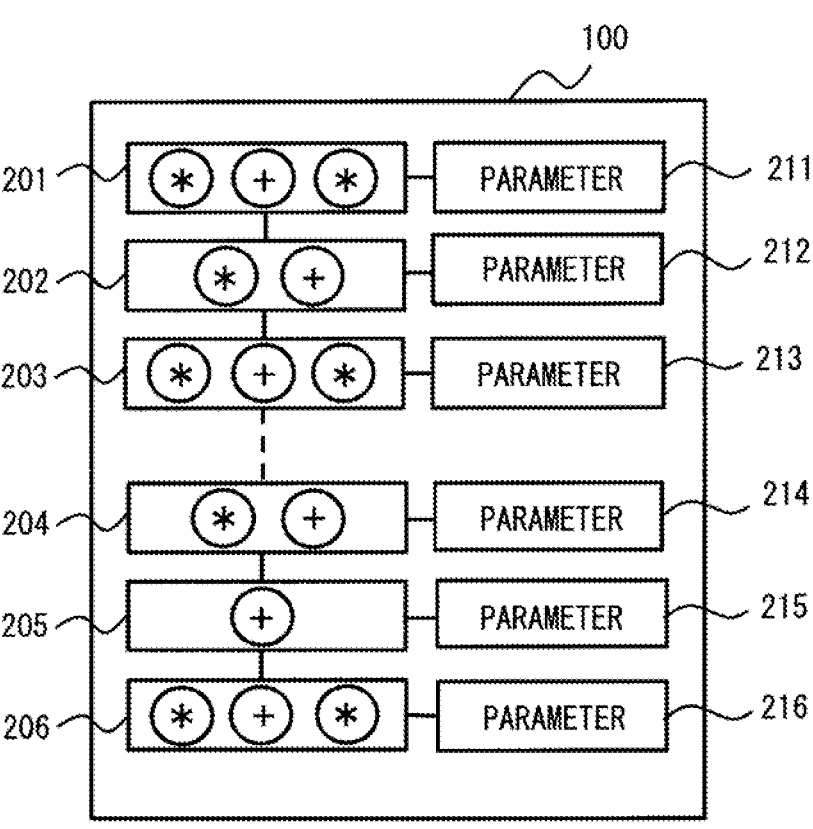
FIG. 1 It depicts an explanatory diagram showing a schematic information processing circuit of the first example embodiment.

FIG. 1 is an explanatory diagram showing a schematic information processing circuit of the first example embodiment. Calculators 201, 202, 203, 204, 205, and 206 in an information processing circuit 100 realizing a CNN are illustrated in FIG. 1. Thus, in FIG. 1, six calculators are illustrated. Each of the calculators 201, 202, 203, 204, 205, and 206 perform a product-sum operation for parameters 211, 212, 213, 214, 215, and 216 used in a layer and input data. The calculators 201 to 206 are realized in multiple combinational circuits. Parameters 211 to 216 are also realized in combinational circuits.

A combinational circuit includes a negative AND circuit (NAND circuit), a negative OR circuit (NOR circuit), a negative circuit (an inverting circuit (NOT circuit)), or an combination of those circuits. In the following description, one circuit element may be described as a combinational circuit, but a circuit including multiple circuit elements (NAND circuit, NOR circuit, NOT circuit, etc.) may also be described as a combinational circuit.

In FIG. 1, "+" indicates an adder. The "*" indicates a multiplier. The number of adders and multipliers shown in the block of calculators 201-206 for each layer illustrated in FIG. 1 is merely an example for expression.

In this example embodiment, parallel operations are performed in each of the calculators 201-206, and each circuit executes calculation in parallel operations is regarded as a basic circuit. The basic circuit is predetermined according to the type of layer.

Figure 2:
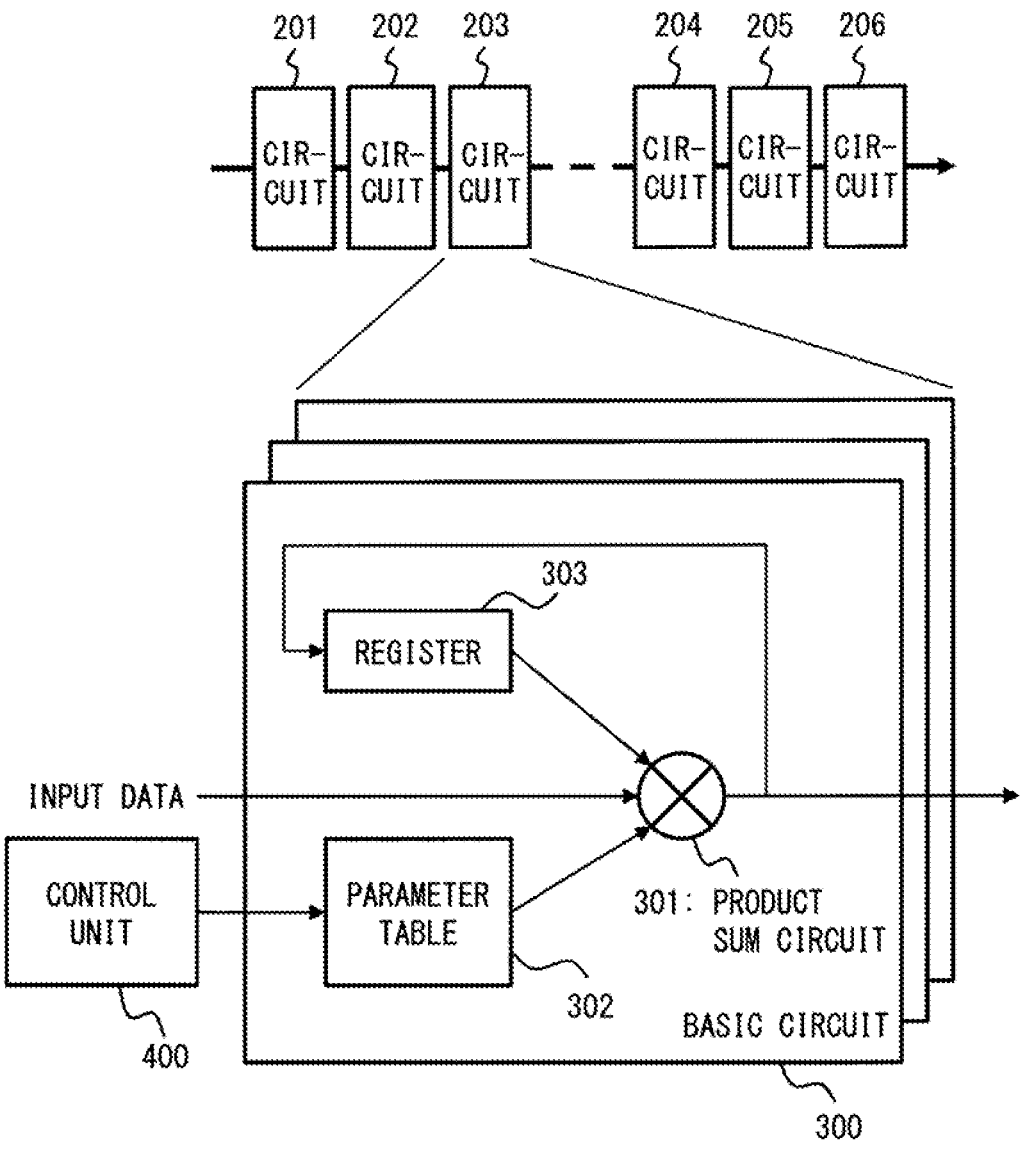
FIG. 2 It depicts an explanatory diagram showing an example of a configuration of a basic circuit of the information processing circuit of the first example embodiment.

FIG. 2 is an explanatory diagram showing an example of a configuration of a basic circuit of the first example embodiment. Calculators (circuits) 201, 202, 203, 204, 205, and 206 in each of six layers are illustrated. In each layer, basic circuits 300 corresponding to the number of parallel processes are provided. FIG. 2 shows an example of basic circuit 300 included in the calculator 203, but each of calculators 201, 202, 204, 205, and 206 in other layers of has a similar circuit configuration.

In the example shown in FIG. 2, the basic circuit 300 includes a product sum circuit 301 which multiplies input data and parameter values from a parameter table (weight table) 302, and adds the multiplied values. The input data may be a single value. The input data may be a group of multiple values. Although FIG. 2 shows a parameter table 302 that stores parameter values, the parameter values are not actually stored in a memory (a memory circuit), but rather the parameter table 302 is realized in a combinational circuit. Since the parameters are fixed in this example embodiment, the parameter table 302 outputs parameter values which are fixed values. The parameter table 302 may output a single value. The parameter table 302 may also output a group of multiple values. The product sum circuit 301 may multiply one input value by one parameter value. The product sum circuit 301 may also perform multiplication of a group of input values by a group of parameter values. The product sum circuit 301 may execute the calculation of the aggregate sum of a group of results of the multiplication of the pair of input values and the pair of parameter values. In general, multiple parameters or multiple groups of parameter values are used for a single layer, and a control unit 400 controls which parameters are output.

The basic circuit 300 may include a register 303 that temporarily stores product-sum operation values. The product sum circuit 301 may include an adder that adds a plurality of multiply values temporarily stored in the register 303. An output of another basic circuit 300 may be connected to the input of the basic circuit 300.

Figure 3:
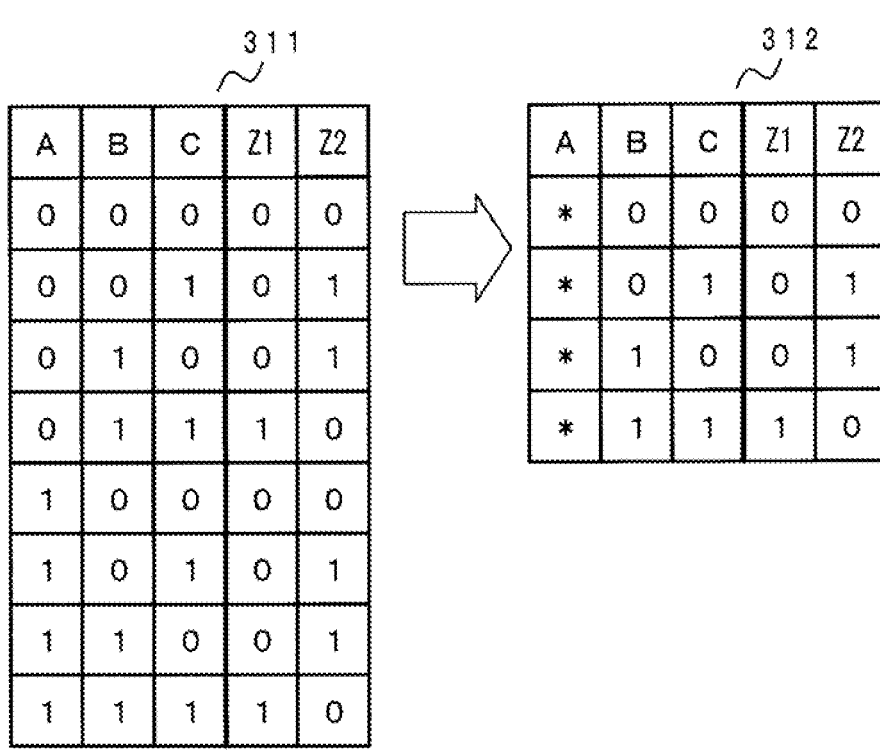
FIG. 3 It depicts an explanatory diagram for explaining of an example circuit configuration of a parameter table.

FIG. 3 is an explanatory diagram for explaining of an example circuit configuration of a parameter table 302. The left side in FIG. 3 shows an example of a truth table 311. The truth table 311 can be realized in a combinational circuit. A, B, and C are inputs to the combinational circuit, respectively. Z1 and Z2 are outputs of the combinational circuit. In the left side in FIG. 3, as an example, the truth table 311 for all adders is illustrated, where A, B, and C can be regarded as addresses, and Z1 and Z2 as output data. That is, Z1 and Z2 can be regarded as output data for the specified addresses A, B, and C. By mapping output data to parameter values, desired parameter values can be obtained in response to some input (specified address).

For example, when the desired parameter value can be determined independently of a particular input value (A in the truth table 311), a simplified truth table 312 may be used. The truth table 312 is simplified so that the parameter values are determined by inputs B and C in the truth table 311. In other words, when the parameter table 302 is realized in a combinational circuit, the fewer the different types of inputs that determine the parameters, the smaller the circuit scale of the combinational circuit. In general, known techniques such as the Quine-McCluskey method are used to simplify the truth table.

The calculator 203 shown in FIG. 2 includes a control unit 400. When the parameter values in the parameter table 302 are realized as output data according to the specified address as shown in FIG. 2, the control unit 400 supplies data of the designated address corresponding to the output data to the parameter table 302 at the desired timing. The parameter table 302 outputs output data, that is a parameter value, corresponding to the designated address to the product sum circuit 301. The desired timing is the time when the product sum circuit 301 performs a multiplication operation using the parameter values to be output from the parameter table 302.

Next, a design method for designing the calculator illustrated in FIG. 2 is explained.

Figure 4:
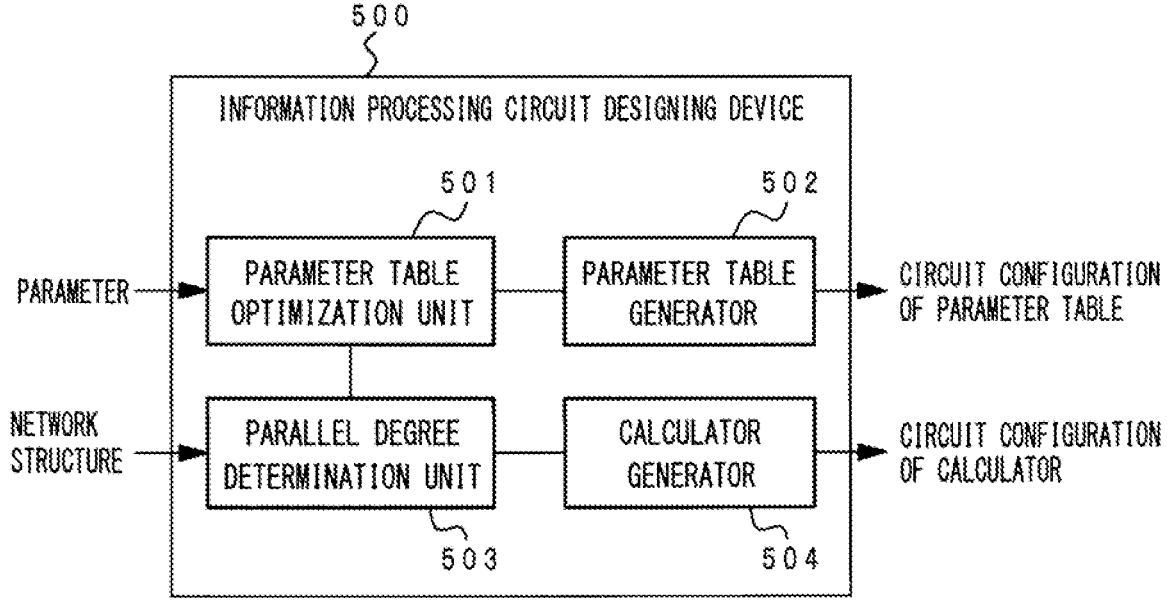
FIG. 4 It depicts a block diagram showing an example of an information processing circuit designing device of the first example embodiment.

FIG. 4 is a block diagram showing an example of an information processing circuit designing device that designs the circuit configuration of the parameter table and the circuit configuration of the calculator for each layer of the CNN. In the example shown in FIG. 4, the information processing circuit designing device 500 includes a parameter table optimization unit 501, a parameter table generator 502, a parallel degree determination unit 503, and a calculator generator 504.

The parallel degree determination unit 503 inputs a network structure (specifically, data indicating the network structure). The calculator generator 504 outputs the circuit configuration of the calculator for each layer. The parameter table optimization unit 501 inputs a parameter set (a weight in each layer) learned in the training phase and a parallel degree determined by the parallel degree determination unit 503. The parameter table generator 502 outputs the circuit configuration of the parameter table.

The parallel degree determination unit 503 determines the parallel degree for each layer. The parameter table optimization unit 501 optimizes the parallel degree based on the input parameters for each layer and the parallel degree for each layer determined by the parallel degree determination unit 503. The number of parameter tables is determined by the parallel degree, and the parameter table optimization unit 501 optimizes parameters in each of the multiple parameter tables 302. Here, optimization means reducing the circuit area of the combinational circuit corresponding to the parameter table.

For example, when the convolutional operation to be performed in the layer for which the parallel degree is to be determined (the target layer) includes $3\times3\times128\times128$ (=147456 product-sum operation (product-sum operation on parameter values and activation values)), in the case where the parallel degree is determined to be "128", the number of basic circuits 300 (parallel degree) is 128. Each of the 300 basic circuits performs 1152 (147456/128) product-sum operations. In that case, in the basic circuit 300, 128 parameter tables each having 1152 parameter values are provided. As mentioned above, the parameter table 302 is not realized in a memory circuit, but in a combinational circuit.

As described below, the parameter table optimization unit 501 uses a predefined method to optimize the parameters of the parameter table 302. The parameter table generator 502 outputs a circuit configuration to realize a parameter table 302 including the optimized parameter values as the circuit configuration of the parameter table.

The calculator generator 504 inputs the parallel degree for each layer determined by the parallel degree determination unit 503. The calculator generator 504 generates, for each layer, a circuit configuration in which the number of basic circuits 300 are arranged. The number is indicated by the parallel degree. Then, the calculator generator 504 outputs the generated circuit configuration for each layer as the circuit configuration of the calculator.

Next, an operation of the information processing circuit designing device of the first example embodiment is described with reference to the flowchart of FIG. 5. FIG. 5 is a flowchart showing an operation of an information processing circuit designing device 500 of the first example embodiment.

The parameter table optimization unit 501 inputs a parameter set (multiple parameter values) learned in the training phase, and the parallel degree determination unit 503 inputs data indicating a predetermined network structure (step S11).

As a type of the deep learning algorithm that is one of the concepts of a network structure in this example embodiment, AlexNet, GoogLeNet, ResNet (Residual Network), SENet (Squeeze-and-Excitation Networks), MobileNet, VGG-16, or VGG-19 is considered. As the number of layers, which is one of the concepts of a network structure, the number of layers based on the type of deep learning algorithm is considered, for example. Note that the concept of a network structure could include a filter size.

Hereinafter, inputting data indicating a network structure is expressed as entering a network structure.

The parallel degree determination unit 503 determines a parallel degree for each layer (step S12). As an example, the parallel degree determination unit 503 determines the parallel degree N using the formula (1). For example, if the number of layers identified by the input deep learning algorithm type is 19, the parallel degree determination unit 503 determines the parallel degree for each of the 19 layers.

$$N=C_L/D_L \qquad (1)$$

In equation (1), $C_L$ indicates the number of clocks required to process all the pixels of one screen in the layer (target layer) for which the parallel degree is to be determined using a single product-sum calculator. $D_L$ indicates the number of clocks required (number of clocks allowed) to process one screen in the layer.

Taking the CNN shown in FIG. 20 as an example, suppose that in a layer (referred to as a layer in the first block) of one screen whose vertical size is 224 and whose horizontal size is 224 (i.e., 50176 pixels), a pixel is processed by one clock, i.e., the entire screen is processed by 50176 clocks. In contrast, in a layer (referred to as a layer in the fifth block) of one screen whose vertical size of 14 and whose horizontal size of 14, if a pixel is processed by 256 clocks in order to complete the processing of one screen in the same period, processing of one screen can be completed by 50176 clocks as same as those in the first layer. The number of processes of the convolution layer of the first block are 3 (vertical size)×3 (horizontal size)×3 (input channel)×64 (output channels), per pixel, i.e., 1728. Therefore, the number of clocks required to process all pixels with a single product-sum calculator is 1728×50176 pixels=8670412. 1728 is required as the parallel degree of the layer in the first block in order to complete processing an entire screen by 50176 clocks. On the other hand, the number of processes of the convolution layer of the fifth block are 3 (vertical size)×3 (horizontal size)×512 ((input channels)×512 (output channels), per pixel, i.e., 2359296. Therefore, the number of clocks required to process all pixels with a single product-sum calculator is 2359296×196 pixels=462422016. 9216 is required as the parallel degree of the layer in the fifth block in order to complete processing an entire screen by 50176 clocks.

By determining the parallel degree of each layer according to the desired calculation speed (processing volume for a screen/number of necessary clocks), for example, by determining the parallel degree of each layer based on formula (1), the calculator of each layer (specifically, the multiple basic circuits 300 included in the calculator) can be kept running at all times. In the configuration shown in FIG. 22, when no effort is made for the calculators 701-706, the utilization rate of calculator 706 is lower than the utilization rate of calculator 701. Taking the configuration described in Non-Patent Document 1 as an example, each layer is fully-parallel, so the utilization rate of the calculator is lower in the layer closer to the output layer. However, in this example embodiment, the utilization rates of the calculators in all layers can be maintained high.

The parameter table optimization unit 501 generates a parameter table 302 for each layer according to the determined parallel degree (step S13). Furthermore, the parameter table optimization unit 501 optimizes the generated parameter table 302 (step S14).

Figure 6:
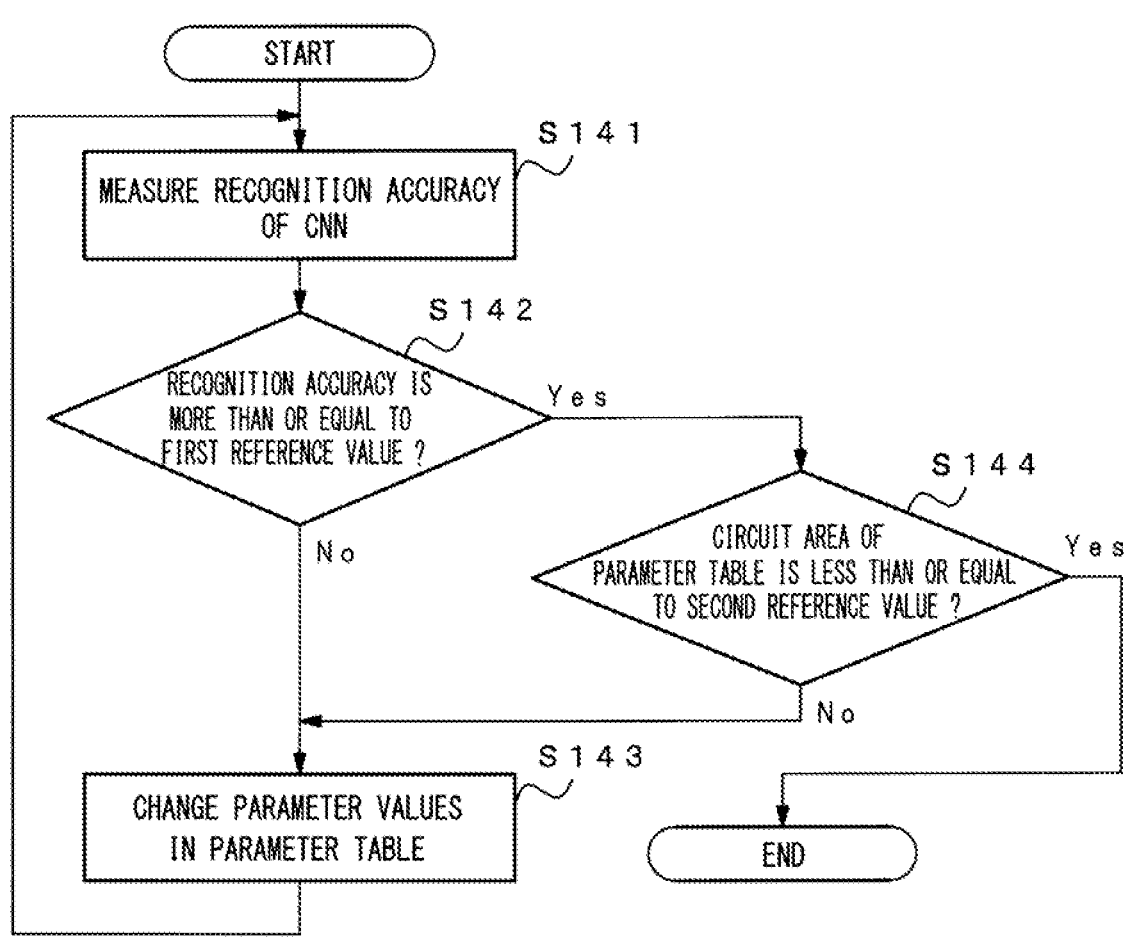
FIG. 6 It depicts a flowchart showing a process for optimizing a parameter table.

FIG. 6 is a flowchart showing an example of a process (parameter table optimization process) for optimizing the parameter table 302.

In the parameter table optimization process, the parameter table optimization unit 501 measures recognition accuracy of the CNN (inference unit) (step S141). In step S141, the parameter table optimization unit 501 performs a simulation using an inference unit which uses the number of basic circuits 300 according to the determined parallel degree and the circuit configuration of the parameter table. The simulation is an inference using appropriate input data. Recognition accuracy is then obtained by comparing the simulation result with the correct answers, for example.

The parameter table optimization unit 501 checks whether the recognition accuracy is more than or equal to the first reference value (step S142). The first reference value is a predetermined threshold value. When the recognition accuracy is more than or equal to the first reference value, the parameter table optimization unit 501 estimates the circuit area of the parameter table 302. Then, the parameter table optimization unit 501 checks whether the circuit area of the parameter table 302 is less than or equal to the second reference value (step S144). The second reference value is a predetermined threshold value. The parameter table optimization unit 501 can estimate the circuit area of the parameter table 302 based on the number of logic circuits in the combinational circuit constituting the parameter table 302, for example.

When the circuit area of the parameter table 302 is less than or equal to the second reference value, the parameter table optimization unit 501 terminates the parameter table optimization process.

When the recognition accuracy is less than the first reference, or the circuit area of the parameter table 302 is more than the second reference, the parameter table optimization unit 501 changes the parameter values (step S143). Then, the processing moves to step S141.

In step S143, when the recognition accuracy is less than the first reference value, the parameter table optimization unit 501 changes parameter values in a direction in which the recognition accuracy is expected to improve. If the direction in which the recognition accuracy is assumed to improve is unknown, the parameter table optimization unit 501 may change the parameter values in a cut and try manner.

In step S143, when the circuit area of the parameter table 302 is more than the second reference value, the parameter table optimization unit 501 changes parameter values so that the circuit area of the parameter table 302 is reduced. Methods for changing parameter values to reduce the circuit area of the parameter table 302 are as follows, for example.

change the parameter value, in the parameter table 302, whose absolute value is less than a predetermined threshold to 0.

replace the parameter value (positive number), in the parameter table 302, that is greater than a predetermined threshold with the largest parameter value in the parameter table 302.

replace the parameter value (negative number), in the parameter table 302, that are smaller than a predetermined threshold with the smallest parameter value in the parameter table 302.

set a representative value for each predetermined region in the parameter table 302, and replace all parameter values in a region with the representative value. The representative value is one of an even value, an odd value, the mode, etc., as an example.

replace the parameter value with the neighboring parameter value in the parameter table 302.

The parameter table optimization unit 501 may use one of the above multiple methods, or a combination of two or more of the above multiple methods.

Figure 7:
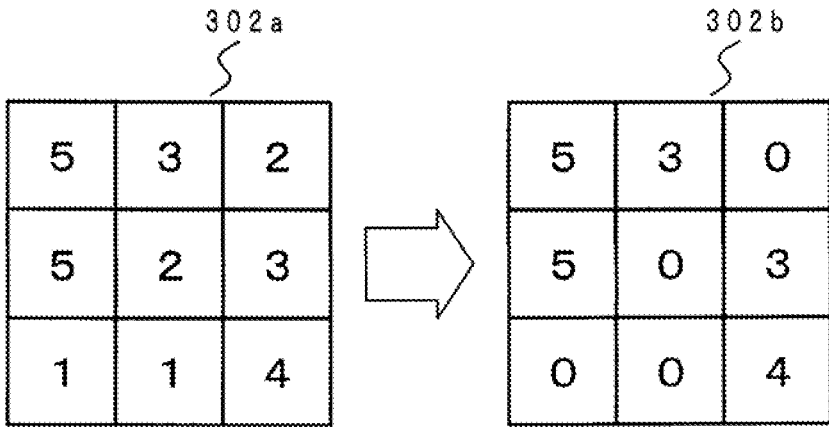
FIG. 7 It depicts an explanatory diagram showing how to change parameter values.

FIG. 7 is an explanatory diagram showing how to change parameter values. FIG. 7 illustrates an example of a parameter table of size 3×3. In the left side of FIG. 7, a parameter table 302*a* before the parameter values are changed is shown. In the eight side of FIG. 7, a parameter table 302*b* after the parameter values have been changed is shown.

In the example shown in FIG. 7, the parameter values that are smaller than the predetermined threshold of "3" is changed to "0".

The common objective of each of the above methods is to ensure that the same values appear frequently in the parameter table 302, i.e., that the parameter values of the same value increase, or that the same pattern is consecutive. The meaning of the consecutive same pattern is that a pattern with the parameter values "1", "2", and "3" (an example of the same pattern) appear in succession, for example.

As mentioned above, when the parameter table 302 is realized in a combinational circuit, the fewer the types of parameter values, the smaller the circuit scale of the combinational circuit. In addition, when the same pattern is consecutive, the circuit scale of the combinational circuit is also expected to be smaller.

In this example embodiment, the information processing circuit designing device 500 terminates the parameter table optimization process when the recognition accuracy of the inference unit is more than or equal to the desired level (specifically, more than or equal to the first reference value) the circuit area becomes to be less than or equal to the desired size (specifically, less than or equal to the second reference value).

Returning to FIG. 5, the calculator generator 504 generates and outputs the circuit configuration of the calculator for each layer (steps S15, S17). In other words, the calculator generator 504 outputs the circuit configuration of the calculator according to the parallel degree of each layer determined by the parallel degree determination unit 503. In this example embodiment, since the basic circuit 300 for each layer is predetermined, the calculator generator 504 generates the number of basic circuits 300 (specifically, layer-specific product sum circuits 301) according to the parallel degree determined by the parallel degree determination unit 503.

The parameter table generator 502 generates and outputs the circuit configuration of the parameter table 302 (steps S16, S17). In other words, the parameter table generator 502 generates and outputs the circuit configuration for outputting the parameter values optimized by the parameter table optimizer 501. The circuit configuration for outputting the parameter values is a combinational circuit configuration that realizes a truth table as illustrated in the right side of FIG. 3, for example.

It should be noted that in the flowchart in FIG. 5, the processes of steps S14 to S16 are executed sequentially, but the process of steps S14 and S16 and the process of step S15 can be executed in parallel.

Even if the parameter table optimization unit 501 that executes the process of step S14 is not provided, the parallel degree determination unit 503 determines the appropriate parallel degree, which has the effect of reducing the size of the circuit.

As explained above, in the inference unit as the information processing circuit of this example embodiment, since the parameter table 302 is realized in a combinational circuit, processing speed is improved as compared with the information processing circuit configured to read the parameter values from memory illustrated in FIG. 21. In addition, since the parallel degree of each layer in the inference unit is determined according to the calculation speed, etc., desired for that layer, the utilization rate of all layers can be maintained higher than when each layer is configured to be fully-parallel. Further, the size of the circuit of this example embodiment of inference unit is smaller than when each layer is configured as fully-parallel. As a result, the power consumption of the inference unit is reduced.

When the information processing circuit designing device 500 is configured to optimize parameter values, the circuit scale of the inference unit can be made smaller.

Although the information processing circuit is described in this example embodiment using a CNN inference unit as an example, this example embodiment can be applied to other networks with layers that perform operations using input data and parameter values. In addition, although image data is used as input data in this example embodiment, this example embodiment can be utilized in networks that use input data other than image data.

Since power consumption in a data center is high, when implementing deep learning algorithm in the data center, it is desirable for deep learning algorithm to run at low power consumption. Since power consumption is reduced when the information processing circuit of this example embodiment is used, the information processing circuit of this example embodiment can be effectively used in the data center.

Low power consumption is also required on the edge side. The information processing circuit of this example embodiment can be effectively used on the edge side as well.

Example Embodiment 2

Figure 8:
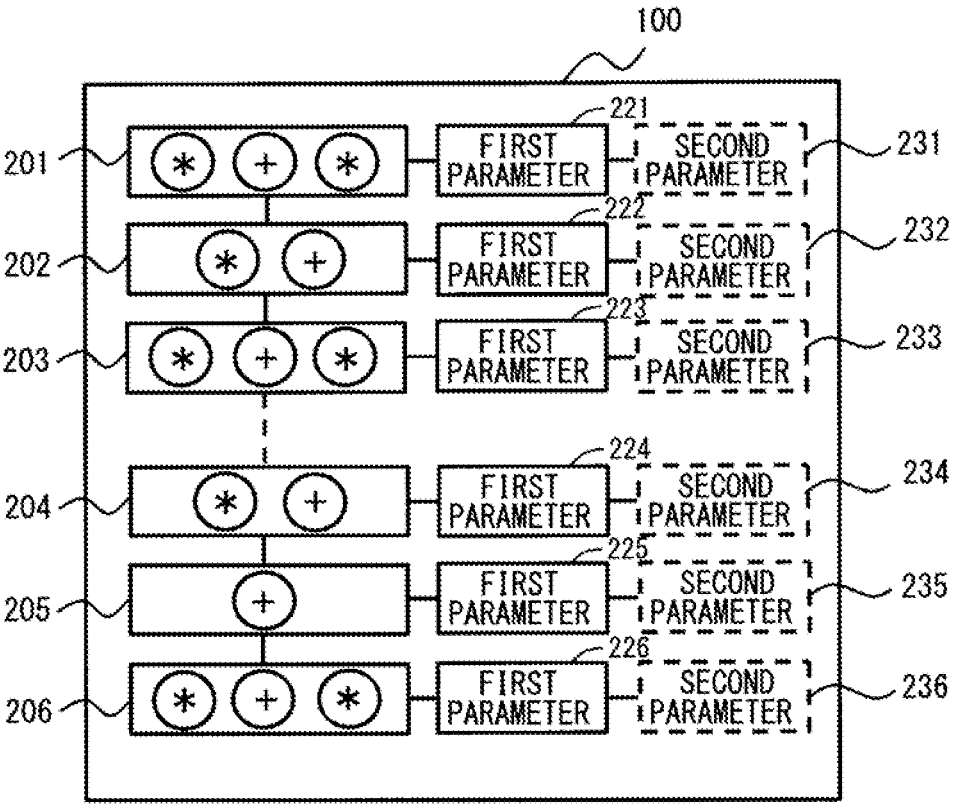
FIG. 8 It depicts an explanatory diagram showing a schematic information processing circuit of the second example embodiment.

FIG. 8 is an explanatory diagram showing a schematic information processing circuit of the second example embodiment. The information processing circuit of this example embodiment is designed so that even if the information processing circuit that performs deep learning is used for multiple applications (for example, for face detection or car detection), it can comply with each application by allowing some parameters to be updated.

In this example embodiment, two types of parameters are assumed. The first parameter is a parameter commonly used in each application of deep learning. The second parameter is a parameter used individually for each application. In FIG. 8, calculators 201, 202, 203, 204, 205, 206 in the information processing circuit 101 using the two types of parameters are illustrated. In other words, FIG. 8 illustrates six layers of a CNN using two types of parameters.

Each of the calculators 201, 202, 203, 204, 205, and 206 performs the product-sum operation using the first parameters 221, 222, 223, 224, 225, and 226 used in the layer, the second parameters 231, 232, 233, 234, 235, 235, and 236, and input data. The calculators 201 to 206 are realized by multiple combinational circuits. In addition, the first parameters 221 to 226 and the second parameters 231 to 236 are also realized by multiple combinational circuits. The difference in the circuit configuration from the information processing circuit 100 of the first example embodiment is that the circuits exist configuring the first parameters and the second parameters respectively.

Specifically, the circuit that configures the first parameter is manufactured in a way that the circuit configuration cannot be changed. On the other hand, the circuit that configures the second parameter is manufactured in a way that allows the circuit configuration to be changed. An example of a circuit whose configuration cannot be changed is a cell-based circuit. An example of a circuit whose configuration can be changed is a gate array or FPGA (Field Programmable Gate Array). In the following description, the circuit that configures the first parameter is referred to as a first parameter output circuit, and the circuit that configures the second parameter is referred to as a second parameter output circuit. A circuit that includes the first parameter output circuit and the second parameter output circuit can also be called a parameter value output circuit.

The information stored in the second parameter output circuit at the time of manufacture is optional because the circuit configuration can be changed. At the time of manufacture, the second parameter output circuit does not have to retain individual information, and any of the parameters may be retained according to the application. Since the circuit of the second parameter output circuit is adjusted (updated) according to the application, the second parameters 231 to 236 are shown with dotted lines in FIG. 8 so as to specify the circumstances.

As in the first example embodiment, parallel operations are performed in each of the calculators 201 to 206. The circuit that executes one operation in a parallel operation is a basic circuit. The basic circuit is predetermined according to the type of layer.

Figure 9:
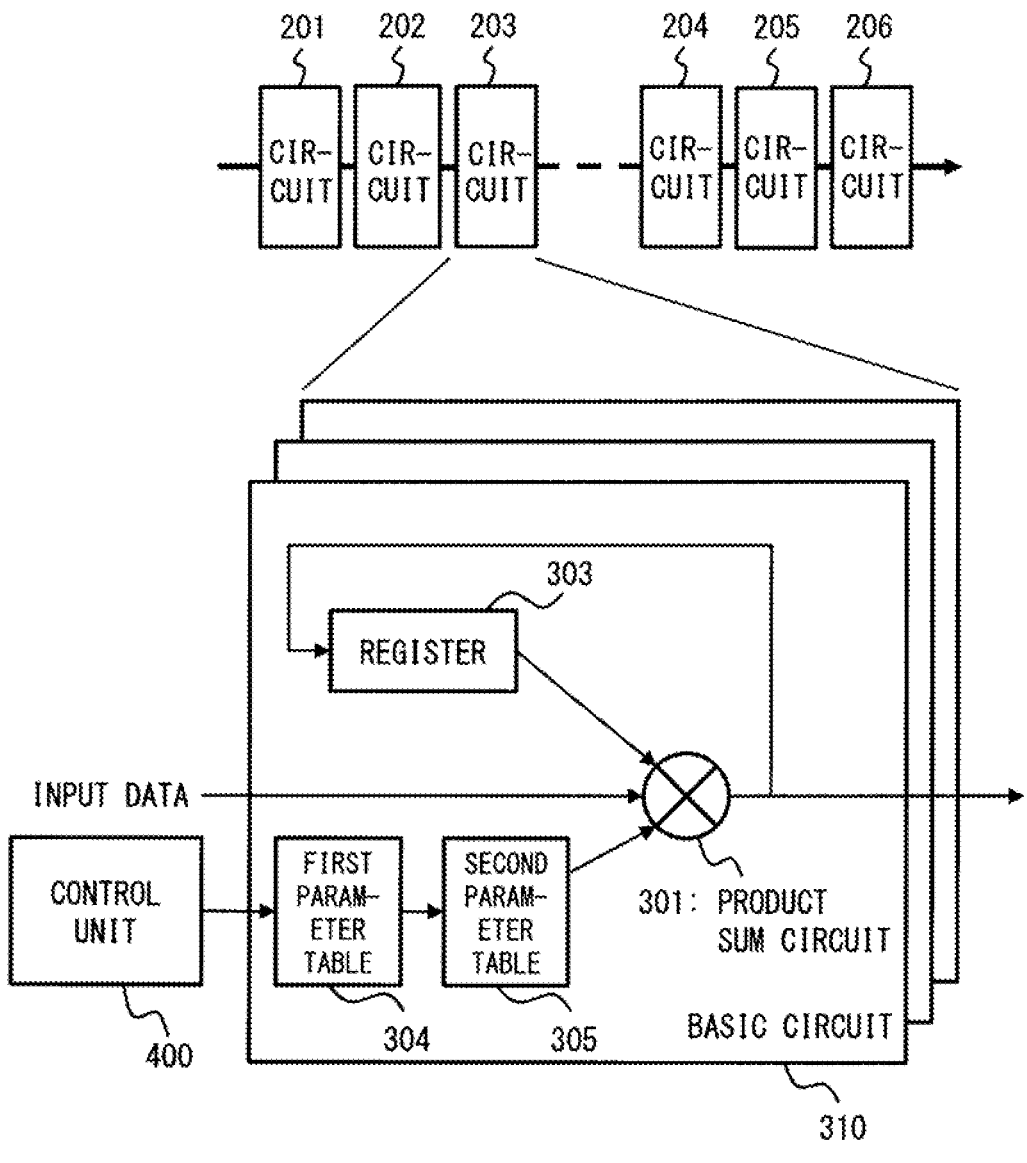
FIG. 9 It depicts an explanatory diagram showing an example of a configuration of a basic circuit of the information processing circuit of the second example embodiment.

FIG. 9 is an explanatory diagram showing an example of a configuration of a basic circuit of the second example embodiment. FIG. 9 illustrates calculators (circuits) 201, 202, 203, 204, 205, and 206 in each of six layers are illustrated. In each layer, basic circuits 310 corresponding to the number of parallel processes are provided. FIG. 9 shows an example of basic circuit 310 included in the calculator 203, but each of calculators 201, 202, 204, 205, and 206 in other layers of has a similar circuit configuration.

The basic circuit 310 includes a product sum circuit 301, a register 303, a first parameter table 304, and a second parameter table 305. As in the first example embodiment, the product sum circuit 301 is a circuit which multiplies input data by a parameter value from the first parameter table 304 and a parameter value from the second parameter table 305, and adds the multiplied values. It is not necessary that all of the basic circuits 310 have the same configuration. For example, one or more of the multiple basic circuits 310 have a product sum circuit 301, a first parameter table 304, and a second parameter table 305.

The first parameter table 304 corresponds to the first parameter output circuit described above, and is a table that stores parameters commonly used in each application of deep learning using the information processing circuit 101 of this example embodiment. The second parameter table 305 corresponds to the second parameter output circuit described above, and is a table which stores parameters used individually for each application.

As described above, in the example shown in FIG. 9, the basic circuit 310 includes the product sum circuit 301 which multiplies input data by a parameter value from the first parameter table 304 and a parameter value from the second parameter table 305, and adds the multiplied values. FIG. 9 illustrates the first parameter table 304 and the second parameter table 305 which store the parameter values. However, the first parameter table 304 and the second parameter table 305 are not actually stored in a memory (memory circuit), but are realized by a combinational circuit, similar to the parameter table 302 of the first example embodiment.

The calculator 203 shown in FIG. 9 includes a control unit 400. When the parameter values in the first parameter table 304 and the second parameter table 305 are realized as output data corresponding to the specified address as in the first example embodiment, the control unit 400 provides the output data corresponding to the specified address data with the first parameter table 304 at the desired timing. The second parameter table 305 through the first parameter table 304 outputs the output data corresponding to the specified address, that is, the parameter value, to the product sum circuit 301. The desired timing is the point in time when the multiplication process will be executed using the parameter values to be output from the first parameter table 304 and the second parameter table 305.

Next, a design method for designing the calculator illustrated in FIG. 9 is explained.

Figure 10:
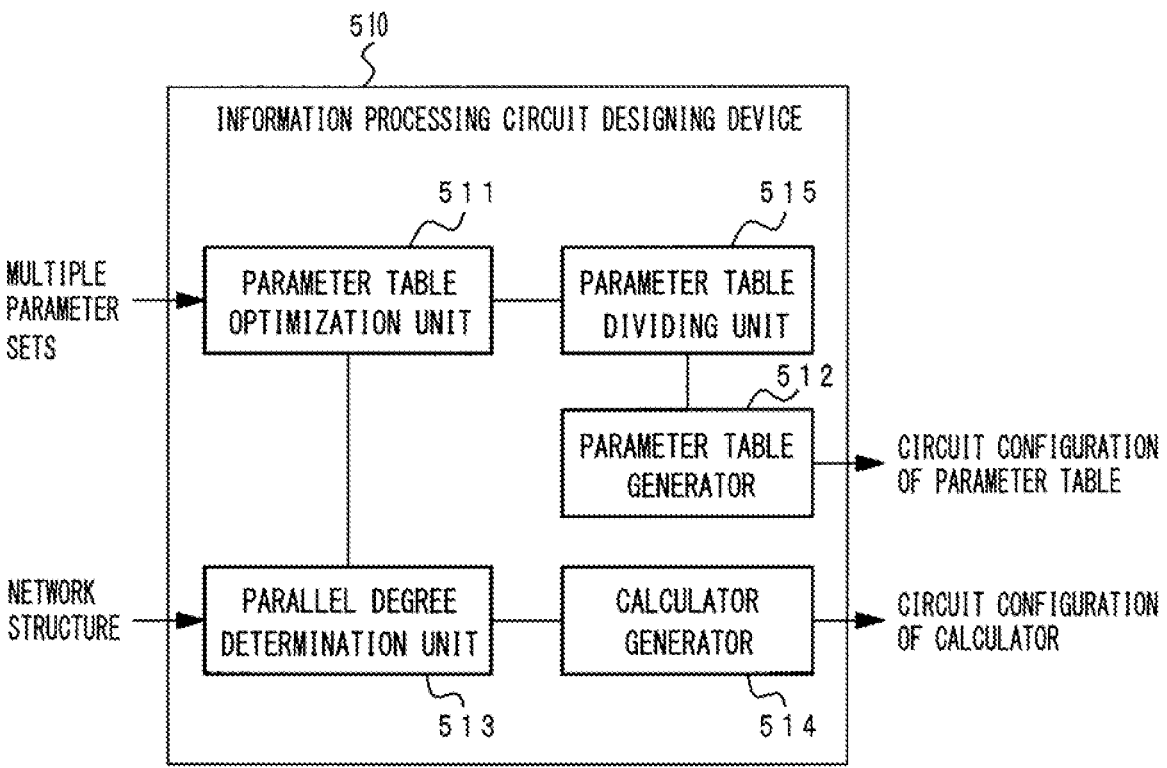
FIG. 10 It depicts a block diagram showing an example of an information processing circuit designing device of the second example embodiment.

FIG. 10 is a block diagram showing an example of an information processing circuit designing device that designs the circuit configuration of the first table and the second parameter table and the circuit configuration of the calculator for each layer of the CNN. In the example shown in FIG. 10, the information processing circuit designing device 510 includes a parameter table optimization unit 511, a parameter table generator 512, a parallel degree determination unit 513, a calculator generator 514, and a parameter table dividing unit 515. Other than the presence of the parameter table dividing unit 515 in the information processing circuit designing device 510, the configuration is the same as that of the information processing circuit design apparatus 500 of the first example embodiment.

The parallel degree determination unit 513 inputs a network structure (specifically, data indicating the network structure). The calculator generator 514 outputs the circuit configuration of the calculator for each layer. The parameter table optimization unit 511 inputs multiple parameter sets (weights in each layer) learned in the training phase and a parallel degree determined by the parallel degree determination unit 513. The multiple parameter sets are specifically the parameter sets of the neural network used for each application.

In the following explanation, the case where two different parameter sets (hereinafter referred to as "parameter set A" and "parameter set B") are input will be explained. In the above example, the parameter set A is equivalent to the parameter set used for face detection and the parameter set B is equivalent to the parameter set used for car detection. However, the number of parameter sets is not limited to two, but may be three or more.

The parallel degree determination unit 513 determines the parallel degree for each layer. The method by which the parallel degree determination unit 513 determines the the parallel degree for each layer is the same as in the first example embodiment. The parameter table optimization unit 511 optimizes the parameter table for each parameter set based on the input parameters for each layer and the parallel degree for each layer determined by the parallel degree determination unit 513. As in the first example embodiment, the number of parameter tables is determined based on the parallel degree, and the parameter table optimization unit 511 optimizes each parameter in each parameter table for each parameter set. The method of optimization is described below.

The parameter table dividing unit 515 divides the parameter table of each optimized parameter set into a common part common to each parameter set and individual parts other than the common part. Specifically, the parameter table dividing unit 515 generates by dividing a combinational circuit (i.e., the common part) that performs a logical operation common to each parameter set and a combinational circuit (i.e., individual part) that inputs an output of the common part in addition to the parameter table to performs an individual logical operation as combinational circuits outputting parameter values. In addition, the parameter table dividing nit 515 may generate a combinational circuit that realizes a parameter table (i.e., the common part) common to each parameter set and a combinational circuit that realizes a parameter table (i.e., the individual part) other than the common part in each parameter set as combinational circuits outputting parameter values.

Specifically, the parameter table dividing unit 515 generates logical expressions each representing the parameter table in each parameter set. Then, the parameter table dividing unit 515 extracts a common logical expression as a common part from the generated logical expression for each parameter set, assumes the remaining logical expression (i.e., not common logical expression) is the individual part. The combinational circuit that realizes the common part corresponds to the first parameter output circuit described above, and the combinational circuit that realizes the individual part corresponds to the second parameter output circuit described above. In other words, the parameter table dividing unit 515 realizes the common part and the individual part in this way.

The larger the circuit area that can be generated as the common part is than the circuit area generated as the individual parts, the smaller the total circuit area becomes. Thus, the larger the ratio of the circuit area occupied by the common part to the sum of the circuit areas occupied by the individual part and the common part, the better the area efficiency. In other words, the smaller the ratio of the circuit area occupied by the individual part, the better the area efficiency. The circuit areas of the common part and the individual part can be estimated, for example, based on the number of logic circuits in each combinational circuit.

The parameter table generator 512 outputs configurations of the first parameter table 304 and the second parameter table 305 (i.e., the common part and the individual part) as the circuit configuration for the parameter table. As mentioned above, the first parameter table 304 and the second parameter table 305 are not realized in a memory circuit, but by a combinational circuit.

The calculator generator 514 inputs the parallel degree for each layer determined by the parallel degree determination unit 513. The calculator generator 514 generates, for each layer, a circuit configuration in which the number of basic circuits 310 indicated by the parallel degree are arranged. Then, the calculator generator 514 outputs the generated circuit configuration for each layer as a calculator circuit configuration.

Figure 11:
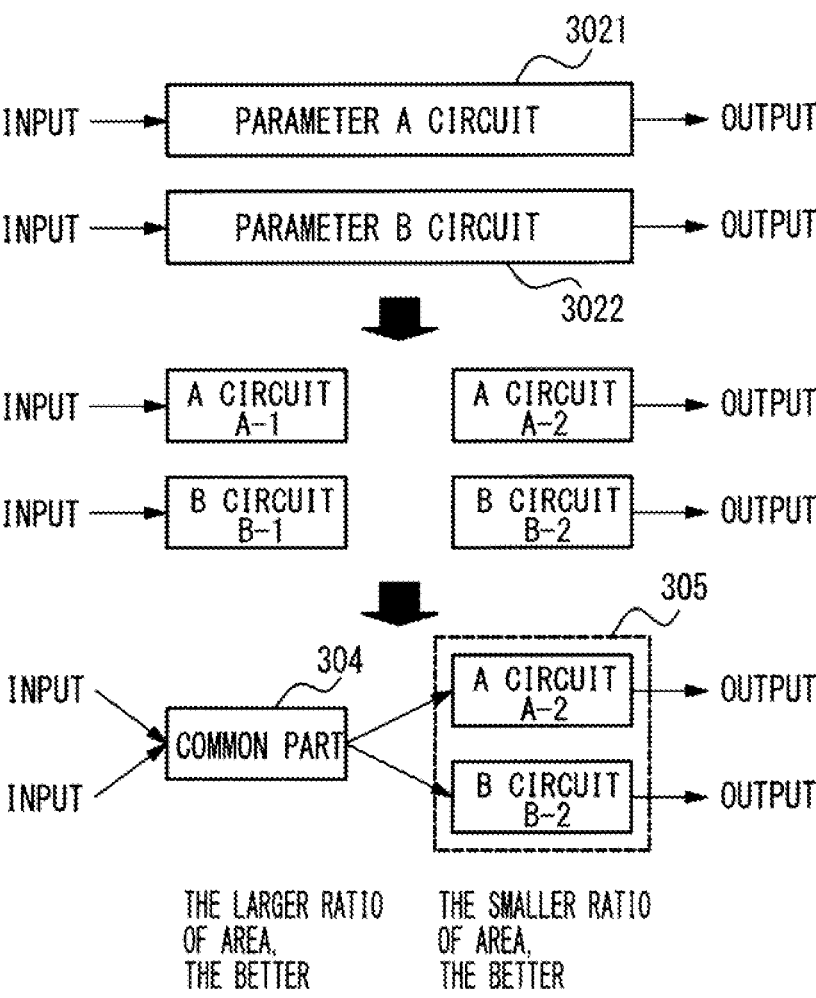
FIG. 11 It depicts an explanatory diagram showing an example of a process of dividing a parameter table.

FIG. 11 is an explanatory diagram showing an example of a process of dividing a parameter table. In the example shown in FIG. 11, a circuit that realizes the parameter table which is obtained by optimizing a parameter set A is shown as the parameter A circuit 3021, and a circuit that realizes a parameter table which is obtained by optimizing a parameter set B is shown as the parameter B circuit 3022.

The parameter table dividing unit 515 extracts A circuit (A-1) and B circuit (B-1) from the parameter A circuit 3021 and the parameter B circuit 3022 as the common part, respectively. As a result, A circuit (A-2) and B circuit (B-2) become the individual part of each parameter set. Then, the parameter table dividing unit 515 sets A circuit (A-1) and B circuit (B-1) as the first parameter table 304 (common part), and sets A circuit (A-2) or B circuit (B-2) as the second parameter table 305 (individual part).

Next, an operation of the information processing circuit designing device of the second example embodiment is described with reference to the flowchart of FIG. 12. FIG. 12 is a flowchart showing an operation of an information processing circuit designing device of the second example embodiment.

The parameter table optimization unit 511 inputs multiple types of parameter sets (multiple parameter values), such as for face detection and car detection, learned in the training phase, and the parallel degree determination unit 513 inputs data indicating the predetermined network structure (step S21).

The parallel degree determination unit 503 determines the parallel degree for each layer (step S22). The method for determining the parallel degree is the same as the method used in the first example embodiment.

The parameter table optimization unit 511 generates a parameter table for each layer according to the determined parallel degree (step S23). Further, the parameter table optimization unit 511 optimizes the generated parameter table (step S24) and divides the optimized parameter set into two parts (i.e., a common part and an individual part), respectively (step S25).

Figure 13:
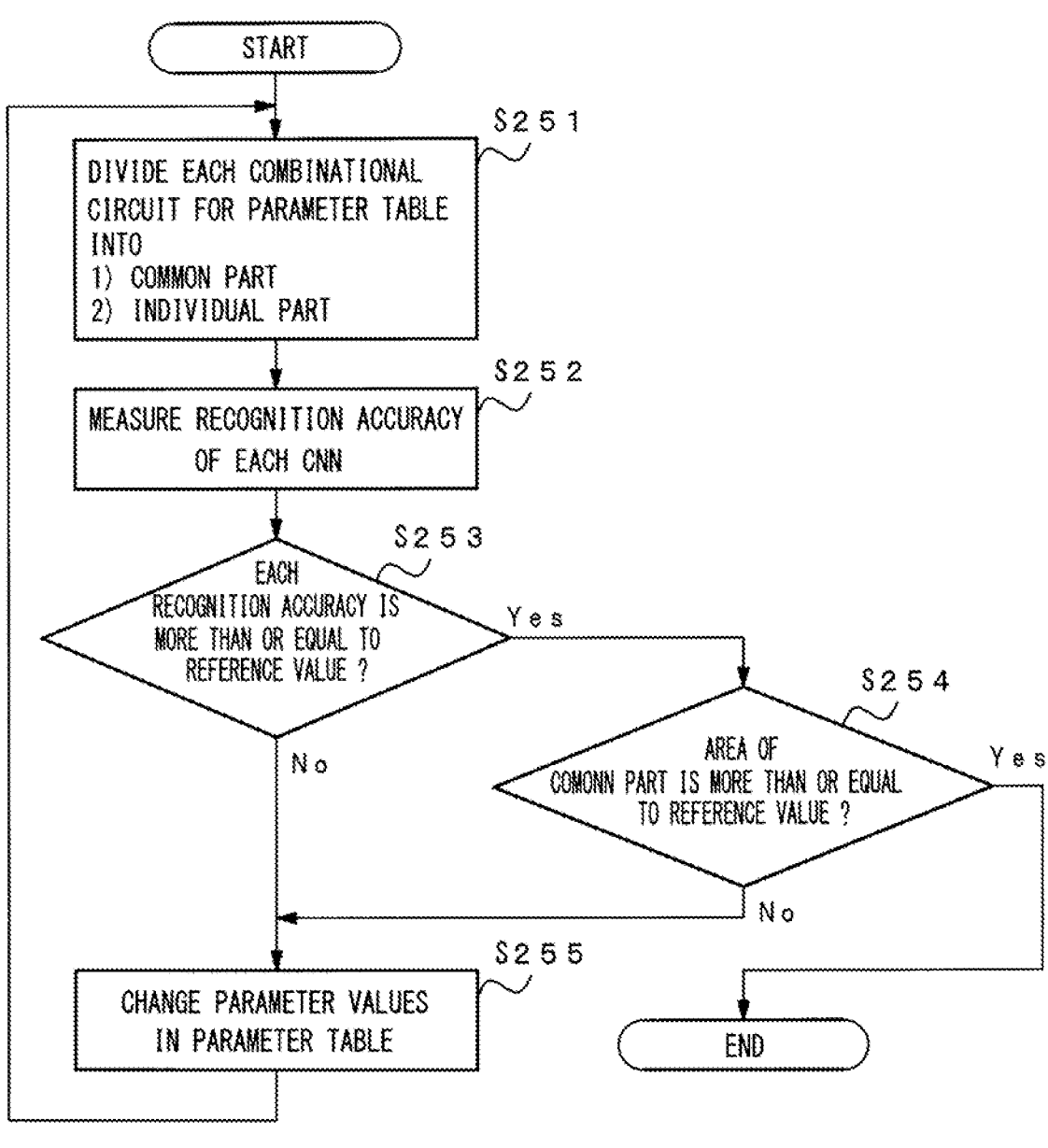
FIG. 13 It depicts a flowchart showing an example of a process of optimizing a parameter table.

Here, the process of optimizing the parameter table is described in detail. FIG. 13 is a flowchart showing an example of a process of optimizing a parameter table (parameter value change process).

In the parameter value change process, the parameter table dividing unit 515 divides the parameter table for each parameter set into a common part and an individual part, as described above (step S251). If there is no common part, the parameter table dividing unit 515 does not perform dividing. Further, the parameter table optimization unit 511 measures recognition accuracy of the CNN (inference unit) using multiple types of parameter sets (for example, parameter set A and parameter set B) (step S252). Then, the parameter table optimization unit 511 determines whether the recognition accuracy of the CNN using each parameter set is more than or equal to a reference value (hereinafter, sometimes referred to as an accuracy reference value) (step S253).

For example, when there are two parameter sets (parameter set A and parameter set B), the parameter table optimization unit 511 determines whether the recognition accuracy of the CNN using the parameter set A is more than or equal to the first reference value, and whether the recognition accuracy of the CNN using the parameter set B is more than or equal to the second reference value.

When each recognition accuracy is more than or equal to the reference value (accuracy reference value) (in the case of Yes in step S253), the process moves to step S254. The first and second reference values are predetermined threshold values. On the other hand, when each recognition accuracy is not more than or equal to the reference value (accuracy reference value) (in the case of No in step S253), the process moves to step S255.

In step S254, the parameter table optimization unit 511 estimates the circuit area occupied by the common part. When the area of the common part is more than or equal to a reference value (hereinafter, referred to as the third reference value or the area reference value), the process is terminated. When the area of the common part is more than or equal to the reference value (in the case of Yes in step S254), the process is terminated. The third reference value is a predetermined threshold value. On the other hand, when the area of the common area is not more than or equal to the reference value (area reference value) (in the case of No in step S254), the process moves to step S255.

In step S255, the parameter table optimization unit 511 changes the parameter values (specifically, at least one of the first and second parameter values) in the parameter table. For example, when the circuit area occupied by the common part is less than the third reference value, the parameter table optimization unit 511 changes the parameter values in the parameter table in the direction that is expected to improve the circuit area. If the direction in which the circuit area is assumed to improve is unknown, the parameter table optimization unit 511 may change the parameter values in a cut and try manner.

Thereafter, the parameter table optimization unit 511 repeats the processes in step S252 and below. In other words, the parameter table optimization unit 511 repeatedly changes at least one of the first and second parameter values. If the recognition accuracy does not reach the reference value as a result of changing the parameter values in step S255, the parameter table optimization unit 511 may return the value changed in step S255 to the original value before the change. In addition, if the recognition accuracy and circuit area do not reach the reference values no matter how many times the parameter values are changed, the parameter table optimization unit 511 may terminate the parameter value change process when the number of times the parameter values are changed reaches the number limit.

FIG. 14 is an explanatory diagram showing an example of a truth table before changing the parameter values. FIG. 14 shows an example of the truth table for circuit A (parameter A circuit 3021) before changing parameters and an example of the truth table for circuit B (parameter B circuit 3022) before changing parameters.

In the truth table 401 for circuit A, each of the designated addresses A, B, and C is an input to a combinational circuit and the parameter Z1 is an output of the combinational circuit. In other words, Z1 can be regarded as the output data for the designated addresses A, B, and C.

Similarly, in the truth table 402 for circuit B, each of designated addresses A, B, and C is an input to a combinational circuit, and the parameter Z2 is an output of the combinational circuit. Z2 can be regarded as the output data for the designated addresses A, B, and C.

In truth table 401, the output parameter (Z1) is expressed in a logical expression as A & (NOT B) & C|A & B & C. In truth table 402, the output parameter (Z2) is expressed in a logical expression as A & (NOT B) & C|(NOT A) & B & (NOT C). In this case, A & (NOT B) & C is common in each parameter table. Therefore, when A & (NOT B) & C is regarded as the common part (D), the expressions after changing are D=A & (NOT B) & C, Z1=D|A & B & C, Z2=D|(NOT A) & B & (NOT C).

On the other hand, FIG. 15 is an explanatory diagram showing an example of a truth table after changing the parameter values shown in FIG. 14. FIG. 15 shows an example of the truth table for circuit A (parameter A circuit 3021) after changing parameters and an example of the truth table for circuit B (parameter B circuit 3022) after changing parameters. Specifically, in truth table 412, the last parameter value (Z2) shown by the underline has been changed from 0 to 1.

In the truth table 411, the output parameter (Z1) is expressed in a logical expression as A & (NOT B) & C|A & B & C. In truth table 412, the output parameter (Z2) is is expressed in a logical expression as A & (NOT B) & C|(NOT A) & B & (NOT C)|A & B & C. In this case, A & (NOT B) & C|A & B & C is common in each parameter table. Therefore, when A & (NOT B) & C|A & B & C is regarded as the common part (D), the expressions after changing are D=A & (NOT B) & C|A & B & C, Z1=D, Z2=D (NOT A) & B & (NOT C).

Here, the circuit areas of the first parameter table 304 and the second parameter table 305 in before (FIG. 14) and after (FIG. 15) changing are compared. The common part (D) is larger after changing than before changing by the amount of a circuit that realizes A & B & C. On the other hand, the individual part (Z1) after changing is smaller than before changing by the amount of a circuit that realizes A & B & C. In other words, the area ratio of the common part is larger and the area ratio of the individual part is smaller after changing than before changing. Therefore, it can be said that the area efficiency is better after changing.

Returning to FIG. 12, the calculator generator 514 generates and outputs the circuit configuration of the calculator for each layer (steps S26, S29). In other words, the calculator generator 514 outputs the circuit configuration of the calculator according to the parallel degree of each layer determined by the parallel degree determination unit 513. In this example embodiment, since the basic circuit 310 for each layer is predetermined, the calculator generator 514 generates the number of basic circuits 310 (specifically, layer-specific product sum circuits 301) according to the parallel degree determined by the parallel degree determination unit 513.

The parameter table generator 512 generates and outputs the circuit configurations of the first parameter table 304 and the second parameter table 305 (steps S27, S28, S29). In other words, the parameter table generator 502 generates and outputs the circuit configuration for outputting the parameter values optimized by the parameter table optimizer 511 and divided by the parameter table dividing unit 515. The circuit configuration for outputting the parameter values is each configuration of the first parameter table circuit and the second parameter table circuit.

It should be noted that in the flowchart in FIG. 12, the processes of steps S24 to S26 are executed sequentially, but the process of steps S25, S26 and S16, and the process of step S25 can be executed in parallel.

As described above, the first and second parameter table circuits are generated by combinational circuits. The first parameter table circuit is manufactured in a way that the circuit configuration cannot be changed after manufacturing, for example, a cell-based way. The second parameter table circuit is manufactured in a way that the circuit configuration can be changed after manufacturing, for example, a gate array way or a FPGA way.

FIG. 16 is an explanatory diagram showing the characteristics of a circuit manufactured by each manufacturing method. The circuit manufactured by the cell-based way "cannot" be changed after manufacturing, but the circuit area can be reduced. On the other hand, the circuit manufactured by the FPGA way "can" be changed after manufacturing, but the circuit area becomes larger. The circuit manufactured by the gate array way can be said to be changeable to some extent, but the circuit area is larger than that of the cell-based method. To reduce the size of the circuit area after manufacturing, it is desirable for the circuit to be manufactured in the cell-based way. However, in the case where the circuit needs to be changed after manufacturing, since it is difficult to change in the cell-based way, it is desirable to manufacture the circuit in the gate array way or the FPGA way.

On the other hand, the information processing circuit of this example embodiment is configured to include, as a parameter value output circuit comprising combinational circuits, a first parameter value output circuit manufactured in a way that the circuit configuration cannot be changed (for example, cell-based way) and a second parameter value output circuit manufactured in a way that the circuit configuration can be changed (for example, FPGA way, gate array way).

Specifically, the first parameter value output circuit is manufactured based on the first parameter table 304 and outputs the first parameter value for performing a logic operation used in any of the multiple types of parameter sets used for CNN. The second parameter value output circuit is manufactured in a way that allows the circuit configuration to be changed after manufacturing, and is adjusted based on the second parameter table 305 after manufacturing, and inputs the output of the first parameter value output circuit in addition to parameter table to output the second parameter value for performing an individual logic operation. In this way, the weights (parameters) can be updated while maintaining area efficiency by fixing the parameters that can be in common while allowing the parameters used individually for each application to be changed.

As described above, the inference unit as an information processing circuit in this example embodiment includes a product sum circuit that performs a product-sum operation using input data and parameter values, and a parameter value output circuit that outputs the parameter value. The parameter value output circuit is configured by a combinational circuit and includes a first parameter value output circuit manufactured in a way that the circuit configuration cannot be changed and a second parameter value output circuit manufactured in a way that the circuit configuration can be changed. As a result, the inference unit of this example embodiment can update weights (parameters) while maintaining area efficiency. Specifically, after manufacturing, the inference unit of this example embodiment can be adjusted so that the second parameter value inputs an output of the first parameter value output circuit in addition to the parameter table to output a calculation result of an individual logic operation.

Although each component in the information processing circuit designing devices 500, 510 shown in FIGS. 4 and 10 may be configured with a piece of hardware or a piece of software. Alternatively, each component may be configured with a plurality of pieces of hardware or a plurality of pieces of software. Further, part of the components may be configured with hardware and the other part with software.

The parameter table optimization unit 511, the parameter table dividing unit 515, and the parameter table generator 512 generate a circuit that outputs parameter values (more specifically, the first parameter values and the second parameter values). This means that the parameter table optimization unit 511, the parameter table dividing unit 515, and the parameter table generator 512 collectively can be referred to as parameter value output circuit generating means (more specifically, first parameter value output circuit generating means and second parameter value output circuit generating means).

FIG. 17 is a block diagram showing an example of a computer with a CPU. When each component in the information processing circuit designing devices 500, 510 is realized by a computer having a processor such as a CPU (Central Processing Unit) and a memory, etc., each component can be realized by the computer with a CPU shown in FIG. 17, for example. In FIG. 17, a storage device 1001 and a memory 1002 connected to the CPU 1000. The CPU 1000 executes processing (information processing circuit designing processing) in accordance with a program stored in a storage device 1001 to realize each function in the information processing circuit designing devices 500, 510 shown in FIGS. 4 and 10. In other words, the computer realizes functions of the parameter table optimization unit 501, 511, the parameter table generator 502, 512, the parallel degree determination unit 503, 513, the calculator generator 504, 514, and the parameter table dividing unit 515 in the information processing circuit designing devices 500, 510 shown in FIGS. 4 and 10.

The storage device 1001 is, for example, a non-transitory computer readable medium. The non-transitory computer readable medium includes various types of tangible storage media. Specific examples of the non-transitory computer readable medium include a magnetic storage media (for example, a hard disk), a magneto-optical storage media (for example, magneto-optical disc), a compact disc-read only memory (CD-ROM), a compact disc-recordable (CD-R), a compact disc-rewritable (CD-R/W), and semiconductor memories (for example, mask ROM, programmable ROM (PROM), erasable PROM (EPROM), flash ROM).

The program may be stored in various types of transitory computer readable media. The transitory computer readable medium is supplied with the program through, for example, a wired or wireless communication channel, or, through electric signals, optical signals, or electromagnetic waves.

The memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

FIG. 18 is a block diagram showing the main part of the information processing circuit. The information processing circuit 10 is an information processing circuit, that performs operations on layers in deep learning, and comprises a product sum circuit 11 (in the example embodiments, realized by the product sum circuit 301) which performs a product-sum operation using input data and parameter values, and a parameter value output circuit 12 (in the example embodiments, realized by the first parameter table 304 and the second parameter table 305) which outputs the parameter values, wherein the parameter value output circuit 12 is composed of a combinational circuit, and includes a first parameter value output circuit 13 (in the example embodiments, realized by the first parameter table 304) manufactured in a way that a circuit configuration cannot be changed and a second parameter value output circuit 14 (in the example embodiments, realized by the second parameter table 305) manufactured in a way that allows a circuit configuration to be changed.

Figure 19:
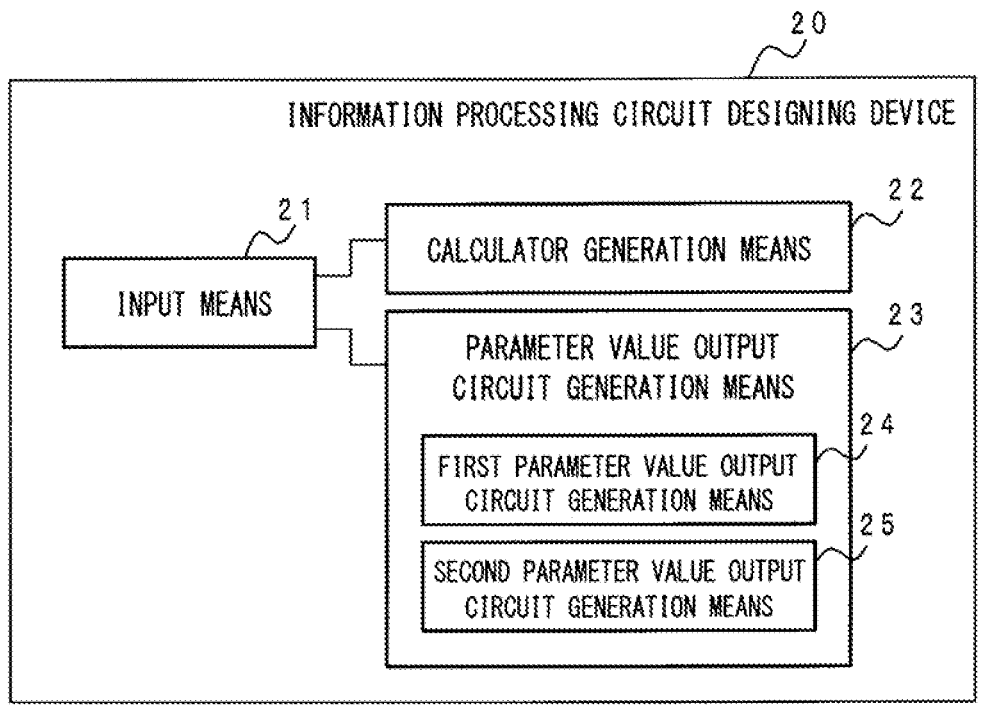
FIG. 19 It depicts a block diagram showing the main part of an information processing circuit designing device.

FIG. 19 is a block diagram showing the main part of an information processing circuit designing device. The information processing circuit designing device 20 comprises input means 21 (in the example embodiments, realized as part of the parameter table optimization unit 511 and part of the parallel degree determination unit 513) for inputting data for identifying multiple types of parameter sets including multiple learned parameter values and a network structure, calculator generation means 22 (in the example embodiments, realized by the calculator generator 514) for generating a product sum circuit which performs a product-sum operation using input data and the parameter values, and specializing in a layer in the network structure, and parameter value output circuit generation means 23 (in the example embodiments, realized by the parameter table optimization unit 511, the parameter table dividing unit 515, and the parameter table generator 512) for generating a combinational circuit that outputs the parameter values in the multiple types of parameter sets, wherein the parameter value output circuit generation means 23 includes first parameter value output circuit generation means 24 (in the example embodiments, realized by the parameter table optimization unit 511, the parameter table dividing unit 515, and the parameter table generator 512) for generating a first parameter value output circuit realized in a way that a circuit configuration cannot be changed, and second parameter value output circuit generation means 25 (in the example embodiments, realized by the parameter table optimization unit 511, the parameter table dividing unit 515, and the parameter table generator 512) for generating a second parameter value output circuit realized in a way that allows a circuit configuration to be changed.

A part of or all of the above example embodiment may also be described as, but not limited to, the following supplementary notes.

(Supplementary note 1) An information processing circuit, that performs operations on layers in deep learning, comprising:

a product sum circuit which performs a product-sum operation using input data and parameter values, and a parameter value output circuit which outputs the parameter values, wherein the parameter value output circuit is composed of a combinational circuit, and includes a first parameter value output circuit manufactured in a way that a circuit configuration cannot be changed and a second parameter value output circuit manufactured in a way that allows a circuit configuration to be changed.

(Supplementary note 2) The information processing circuit according to Supplementary note 1, wherein the first parameter value output circuit outputs parameter values commonly used in each application of deep learning, and the second parameter value output circuit outputs parameter values used individually for each application.

(Supplementary note 3) The information processing circuit according to Supplementary note 1 or 2, further comprising basic circuits corresponding to the number of parallel processes, wherein one or more the basic circuits includes the product sum circuit, the first parameter value output circuit and the second parameter value output circuit.

(Supplementary note 4) A method of designing an information processing circuit for generating the information processing circuit performing operations on layers in deep learning, comprising:

inputting data for identifying multiple types of parameter sets including multiple learned parameter values and a network structure, generating a product sum circuit which performs a product-sum operation using input data and the parameter values, and specializing in a layer in the network structure, and generating, as a combinational circuit that outputs the parameter values in the multiple types of parameter sets, a first parameter value output circuit realized in a way that a circuit configuration cannot be changed and a second parameter value output circuit realized in a way that allows a circuit configuration to be changed.

(Supplementary note 5) The method of designing an information processing circuit according to Supplementary note 4, further comprising generating the first parameter value output circuit which performs a logic operation used in any of the multiple types of parameter sets used for a neural network, and generating the second parameter value output circuit which inputs an output of the first parameter value output circuit in addition to the parameter table to perform an individual logic operation.

(Supplementary note 6) The method of designing an information processing circuit according to Supplementary note 4 or 5, further comprising measuring each accuracy of the information processing circuits in a neural network using the multiple types of parameter sets, estimating a circuit area of the first parameter value output circuit and a circuit area of the second parameter value output circuit, and changing at least one of a first parameter value and a second parameter value until a condition that the accuracy of each neural network using each of the multiple types of parameter sets is more than or equal to a predetermined accuracy reference value and that a ratio of the circuit area of the first parameter value output circuit is more than or equal to a predetermined area reference value is satisfied.

(Supplementary note 7) A computer readable recording medium storing a program of designing an information processing circuit for generating the information processing circuit performing operations on layers in deep learning, the program for designing an information processing circuit causing a processor to execute:

a process of inputting data for identifying multiple types of parameter sets including multiple learned parameter values and a network structure, a process of generating a product sum circuit which performs a product-sum operation using input data and the parameter values, and specializing in a layer in the network structure, and a process of generating, as a combinational circuit that outputs the parameter values in the multiple types of parameter sets, a first parameter value output circuit realized in a way that a circuit configuration cannot be changed and a second parameter value output circuit realized in a way that allows a circuit configuration to be changed.

(Supplementary note 8) The recording medium according to Supplementary note 7, wherein the program of designing an information processing circuit further causes a processor to execute a process of generating the first first parameter value output circuit which performs a logic operation used in any of the multiple types of parameter sets used for a neural network, and a process of generating the second parameter value output circuit which inputs an output of the first parameter value output circuit in addition to the parameter table to perform an individual logic operation.

(Supplementary note 9) An information processing circuit designing device which generates an information processing circuit performing operations on layers in deep learning, comprising:

input means for inputting data for identifying multiple types of parameter sets including multiple learned parameter values and a network structure, calculator generation means for generating a product sum circuit which performs a product-sum operation using input data and the parameter values, and specializing in a layer in the network structure, and parameter value output circuit generation means for generating a combinational circuit that outputs the parameter values in the multiple types of parameter sets, wherein the parameter value output circuit generation means includes first parameter value output circuit generation means for generating a first parameter value output circuit realized in a way that a circuit configuration cannot be changed, and second parameter value output circuit generation means for generating a second parameter value output circuit realized in a way that allows a circuit configuration to be changed.

(Supplementary note 10) The information processing circuit designing device according to Supplementary note 9, wherein the first parameter value output circuit generation means generates the first first parameter value output circuit which performs a logic operation used in any of the multiple types of parameter sets used for a neural network, and the second parameter value output circuit generation means generates the second parameter value output circuit which inputs an output of the first parameter value output circuit in addition to the parameter table to perform an individual logic operation.

(Supplementary note 11) A program of designing an information processing circuit for generating the information processing circuit performing operations on layers in deep learning, causing a computer to execute:

a process of inputting data for identifying multiple types of parameter sets including multiple learned parameter values and a network structure, a process of generating a product sum circuit which performs a product-sum operation using input data and the parameter values, and specializing in a layer in the network structure, and a process of generating, as a combinational circuit that outputs the parameter values in the multiple types of parameter sets, a first parameter value output circuit realized in a way that a circuit configuration cannot be changed and a second parameter value output circuit realized in a way that allows a circuit configuration to be changed.

(Supplementary note 12) The program of designing an information processing circuit according to Supplementary note 11, causing a computer to execute a process of generating the first first parameter value output circuit which performs a logic operation used in any of the multiple types of parameter sets used for a neural network, and a process of generating the second parameter value output circuit which inputs an output of the first parameter value output circuit in addition to the parameter table to perform an individual logic operation.

Although the invention of the present application has been described above with reference to the example embodiment, the present invention is not limited to the above example embodiment. Various changes can be made to the configuration and details of the present invention that can be understood by those skilled in the art within the scope of the present invention.

REFERENCE SIGNS LIST

10 Information processing circuit
11 Product sum circuit
12 Parameter value output circuit
13 First parameter value output circuit
14 Second parameter value output circuit
20 Information processing circuit designing device
21 Input means
22 Calculator generation means
23 Parameter value output circuit generation means
24 First parameter value output circuit generation means
25 Second parameter value output circuit generation means
100, 101 Information processing circuit
201, 202, 203, 204, 205, 206 Calculator
211, 212, 213, 214, 215, 216 Parameter
221, 222, 223, 224, 225, 226 First parameter
231, 232, 233, 234, 235, 236 Second parameter
300, 310 Basic circuit
301 Product sum circuit
302 Parameter table
3021 Parameter A table
3022 Parameter B table
303 Register
304 First parameter table
305 Second parameter table
400 Control unit
500, 510 Information processing circuit designing device
501, 511 Parameter table optimization unit
502, 512 Parameter table generator
503, 513 Parallel degree determination unit
504, 514 Calculator generator
515 Parameter table dividing unit
1000 CPU
1001 Storage device
1002 Memory

What is claimed is:

1. An information processing circuit, that performs operations on layers in deep learning, comprising:

a product sum circuit which performs a product-sum operation using input data and parameter values, and a parameter value output circuit which outputs the parameter values, wherein the parameter value output circuit is composed of a combinational circuit, and includes a first parameter value output circuit manufactured in a way that a circuit configuration cannot be changed and a second parameter value output circuit manufactured in a way that allows a circuit configuration to be changed.

2. The information processing circuit according to claim 1, wherein the first parameter value output circuit outputs parameter values commonly used in each application of deep learning, and the second parameter value output circuit outputs parameter values used individually for each application.

3. The information processing circuit according to claim 1, further comprising basic circuits corresponding to the number of parallel processes, wherein one or more the basic circuits includes the product sum circuit, the first parameter value output circuit and the second parameter value output circuit.

4. The information processing circuit according to claim 2, further comprising basic circuits corresponding to the number of parallel processes, wherein one or more the basic circuits includes the product sum circuit, the first parameter value output circuit and the second parameter value output circuit.

5. A method of designing an information processing circuit for generating the information processing circuit performing operations on layers in deep learning, comprising:

inputting data for identifying multiple types of parameter sets including multiple learned parameter values and a network structure, generating a product sum circuit which performs a product-sum operation using input data and the parameter values, and specializing in a layer in the network structure, and generating, as a combinational circuit that outputs the parameter values in the multiple types of parameter sets, a first parameter value output circuit realized in a way that a circuit configuration cannot be changed and a second parameter value output circuit realized in a way that allows a circuit configuration to be changed.

6. The method of designing an information processing circuit according to claim 5, further comprising generating the first parameter value output circuit which performs a logic operation used in any of the multiple types of parameter sets used for a neural network, and generating the second parameter value output circuit which inputs an output of the first parameter value output circuit in addition to the parameter table to perform an individual logic operation.

7. The method of designing an information processing circuit according to claim 5, further comprising measuring each accuracy of the information processing circuits in a neural network using the multiple types of parameter sets, estimating a circuit area of the first parameter value output circuit and a circuit area of the second parameter value output circuit, and changing at least one of a first parameter value and a second parameter value until a condition that the accuracy of each neural network using each of the multiple types of parameter sets is more than or equal to a predetermined accuracy reference value and that a ratio of the circuit area of the first parameter value output circuit is more than or equal to a predetermined area reference value is satisfied.

8. The method of designing an information processing circuit according to claim 6, further comprising measuring each accuracy of the information processing circuits in a neural network using the multiple types of parameter sets, estimating a circuit area of the first parameter value output circuit and a circuit area of the second parameter value output circuit, and changing at least one of a first parameter value and a second parameter value until a condition that the accuracy of each neural network using each of the multiple types of parameter sets is more than or equal to a predetermined accuracy reference value and that a ratio of the circuit area of the first parameter value output circuit is more than or equal to a predetermined area reference value is satisfied.

9. An information processing circuit designing device which generates an information processing circuit performing operations on layers in deep learning, comprising:

an input unit which inputs data for identifying multiple types of parameter sets including multiple learned parameter values and a network structure, a calculator generator which generates a product sum circuit which performs a product-sum operation using input data and the parameter values, and specializing in a layer in the network structure, and a parameter value output circuit generator which generates a combinational circuit that outputs the parameter values in the multiple types of parameter sets, wherein the parameter value output circuit generator includes a first parameter value output circuit generator which generates a first parameter value output circuit realized in a way that a circuit configuration cannot be changed, and a second parameter value output circuit generator which generates a second parameter value output circuit realized in a way that allows a circuit configuration to be changed.

10. The information processing circuit designing device according to claim 9, wherein the first parameter value output circuit generator generates the first first parameter value output circuit which performs a logic operation used in any of the multiple types of parameter sets used for a neural network, and the second parameter value output circuit generator generates the second parameter value output circuit which inputs an output of the first parameter value output circuit in addition to the parameter table to perform an individual logic operation.

* * * * *